(12) United States Patent
Hatta et al.

(10) Patent No.: US 8,007,937 B2
(45) Date of Patent: Aug. 30, 2011

(54) BATTERY PACK

(75) Inventors: Kazuhito Hatta, Fukushima (JP); Masato Sato, Fukushima (JP); Tsuyoshi Sugiyama, Fukushima (JP); Hiroyuki Yamada, Fukushima (JP); Koji Sakai, Fukushima (JP); Norio Mamada, Fukushima (JP); Takeru Yamamoto, Fukushima (JP); Kazuo Honda, Fukushima (JP)

(73) Assignee: Sony Corporation, Tokyo (JP)

( * ) Notice: Subject to any disclaimer, the term of this patent is extended or adjusted under 35 U.S.C. 154(b) by 1083 days.

(21) Appl. No.: 11/566,014

(22) Filed: Dec. 1, 2006

(65) Prior Publication Data

US 2007/0128513 A1 Jun. 7, 2007

(30) Foreign Application Priority Data

Dec. 2, 2005 (JP) .................. P2005-350012

(51) Int. Cl.
*H01M 2/02* (2006.01)
*H01M 2/08* (2006.01)

(52) U.S. Cl. ............... 429/163; 429/176; 429/185

(58) Field of Classification Search .............. None
See application file for complete search history.

(56) References Cited

U.S. PATENT DOCUMENTS

| 6,000,886 A * | 12/1999 | Washio et al. ............ 408/1 R |
| 7,049,560 B2 | 5/2006 | Fukuda et al. |
| 7,709,114 B2 * | 5/2010 | Hatta et al. ............... 429/7 |
| 2003/0165736 A1 | 9/2003 | Hiratsuka |
| 2004/0029001 A1 * | 2/2004 | Yamazaki et al. ........ 429/176 |
| 2004/0115527 A1 | 6/2004 | Hiratsuka et al. |
| 2004/0188419 A1 | 9/2004 | Fukuda et al. |
| 2005/0136324 A1 | 6/2005 | Yamada et al. |
| 2006/0057461 A1 * | 3/2006 | Hamada et al. ........... 429/181 |

FOREIGN PATENT DOCUMENTS

| JP | 2000-090897 | 3/2000 |
| JP | 2000-285906 | 10/2000 |
| JP | 2001-307703 | 11/2001 |
| JP | 2003-303580 | 10/2003 |
| JP | 2003-323876 | 11/2003 |
| JP | 2004-303580 | 10/2004 |
| JP | 2004-319144 | 11/2004 |
| JP | 2005-166650 | 6/2005 |
| JP | 2006-093131 | 4/2006 |

OTHER PUBLICATIONS

Takami, "Utrathin Lithium-Ion Battery Using Aluminum Laminated Film Case," Toshiba Review, Feb. 2001, vol. 56, p. 10-13.

* cited by examiner

*Primary Examiner* — Jonathan Crepeau
(74) *Attorney, Agent, or Firm* — K&L Gates LLP

(57) ABSTRACT

A battery pack is provided. The battery pack includes: a generator device having a battery element disposed on a flexible covering material folded to cover the battery element, wherein three sides of the flexible covering material around the battery element are sealed; a rigid covering material for covering the generator device, having an opening and being bonded to the flexible covering material of the generator device; and a cover fitted into the opening of the rigid covering material, wherein the rigid covering material has a three-layer structure having an outer packaging layer, a metal layer, and a heat-bonding layer which are stacked on one another, and the heat-bonding layer is one selected from an ethylene-vinyl acetate copolymer, an ethylene-acrylic acid copolymer, an ethyl acrylate copolymer, a methyl acrylate copolymer, a methacrylic acid copolymer, a methyl methacrylate copolymer, polyacrylonitrile, an ethylene vinyl alcohol resin, a polyamide resin, a polyester resin, acid-modified polypropylene, or an ionomer.

11 Claims, 16 Drawing Sheets

FIG. 4A
RELATED ART
FIG. 4C
RELATED ART
FIG. 4B
RELATED ART
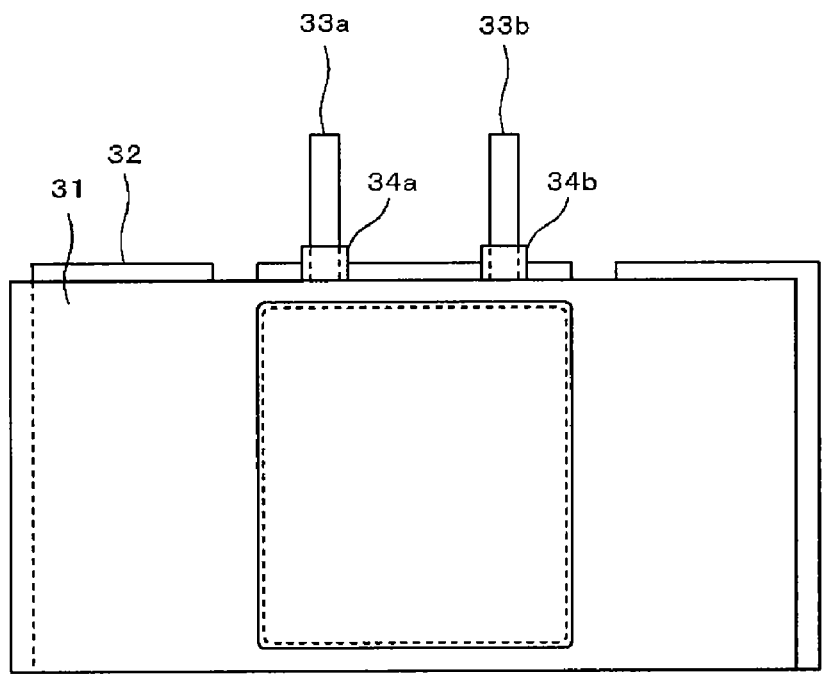
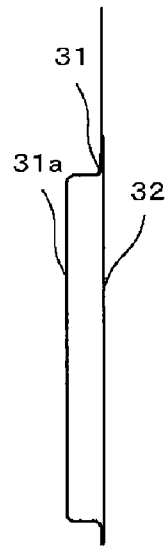

BATTERY PACK

CROSS REFERENCES TO RELATED APPLICATIONS

The present application claims priority to Japanese Patent Application No. JP2005-350012 filed in the Japanese Patent Office on Dec. 2, 2005, the entire contents of which is being incorporated herein by reference.

BACKGROUND

The present disclosure relates to a battery pack applied to, e.g., a lithium ion secondary battery.

In recent years, various types of portable electronic devices, such as videotape recorders (VTRs) with camera, cell phones, and laptop computers, are widely used, and those having smaller size and weight are being developed. As the portable electronic devices are miniaturized, demand for battery as a power source of them is rapidly increasing, and, for reducing the size and weight of the device, a battery for the device must be designed so that the battery is lightweight and thin and the space in the device can be efficiently used. As a battery that can meet such demands, a lithium ion secondary battery having a large energy density and a large power density is preferred.

Especially, batteries having high selectivity of shape, sheet-type batteries having a reduced thickness and a large area, or card-type batteries having a reduced thickness and a small area are desired. For meeting the demands, as described in TAKAMI Norio, "Ultra thin lithium-ion battery using aluminum laminated film case", Toshiba Review, Toshiba Corporation, Vol. 56 No. 2, February 2001, pp. 10-13, a thin battery is produced using an external packaging material in a film form, such as an aluminum laminated film, making it possible to obtain the above-mentioned battery having a reduced thickness.

FIG. 1 shows the appearance of a battery 1 described in TAKAMI Norio, "Ultra thin lithium-ion battery using aluminum laminated film case", Toshiba Review, Toshiba Corporation, Vol. 56 No. 2, February, 2001, pp. 10-13. The thin battery is produced by covering a flat-type battery element, which is formed by stacking a positive electrode and a negative electrode through a separator and spirally winding them, with an aluminum laminated film, and sealing the aluminum laminated film around the battery element. A positive electrode terminal 2a and a negative electrode terminal 2b (hereinafter, frequently referred to as "electrode terminals" unless otherwise specified) connected to the positive electrode and negative electrode are electrically introduced from the battery, for example, from one side of the thin battery 1, and the aluminum laminated film around the battery element except for one side is sealed and then an electrolytic solution is charged from the unsealed opening, and finally the side of the film from which the electrode terminals are electrically introduced is sealed, thus obtaining the above-mentioned thin battery.

The battery of this type uses an aluminum laminated film having a thickness of about 100 μm as external packaging, and hence has small battery strength, as compared to a battery using a metallic can, and it is difficult to use this battery as a battery pack as it is. Therefore, a battery pack containing a battery element covered with a laminated film in a pack housing made of a plastic is widely used.

However, the battery pack using the above pack housing has a small metal ratio in the external packaging portion and hence has poor heat radiation properties. Therefore, when accidental heat generation occurs, the temperature in the battery pack tends to increase.

For solving the problem, Japanese Patent Application Publication No. 2003-303580 has proposed a battery pack 10 shown in FIG. 2, which includes a battery element 12 covered with a laminated film and contained in an external packaging case 11 made of a metal having satisfactory strength and having an opening at one end, and a circuit board 13 attached to the battery element. JP2003-303580 has a description showing that, by using aluminum having a thickness of about 150 to 200 μm or the like as the external packaging case, a battery pack having high strength can be obtained.

Japanese Patent Application Publication No. 2004-165134 discloses a battery pack 20 having a construction shown in FIG. 3, which includes a battery element 21 covered with a wrapping material, a circuit board 24, a frame 22 provided around the battery element 21, and a wrapping material 23, having a strength higher than that of the wrapping material for covering the battery element 21, for covering the battery element 21, the circuit board 24, and the frame 22. The frame 22 used in the battery pack in the patent document 2 can be formed from a plastic material, and therefore the frame not only can secure the battery strength, but also can protect the battery element from an impact, such as a drop impact.

Further, Japanese Patent Application Publication No. 2005-166650 includes a description of a battery pack using a rigid laminated film in part of an external packaging material, wherein the rigid laminated film constitutes the outermost layer of the battery.

FIGS. 4A to 4C and FIGS. 5A and 5B are diagrammatic views showing constructions of the battery in JP 2005-166650, which is being fabricated. In JP 2005-166650, a flexible laminated film 31 having a recess portion 31a and a rigid laminated film 32 are used, and a battery element is contained in the recess portion 31a. The rigid laminated film 32 is then placed over the flexible laminated film 31 so that it covers the opening of the recess portion 31a, and the flexible laminated film 31 and the rigid laminated film 32 are sealed at the stacked portion around the battery element. Subsequently, as shown in FIG. 5B, the rigid laminated film 32 and flexible laminated film 31 are molded so that they contain a battery element 35, and a circuit board and resin molded cover are provided, thus producing a battery pack 30 in which the rigid laminated film 32 constitutes the outermost layer. This battery pack has excellent volume efficiency and achieves a high battery strength.

However, the above described related art battery packs have the following problems. Specifically, in the battery pack having the construction described in JP 2003-303580, the battery element covered with a laminated film is further placed in the external packaging case having a thickness of about 150 to 200 μm, and hence high battery strength can be achieved, but the volume efficiency is low.

In the battery pack having the construction described in JP 2004-165134, the use of the frame achieves high battery strength, but the volume efficiency is low.

Further, in the battery pack having the construction described in JP 2005-166650, the rigid laminated film is difficult to mold, and therefore the rigid laminated film and the flexible laminated film must be used in combination to cover the battery element. In stacking the rigid laminated film and the flexible laminated film and sealing them, the four sides of the stacked films around the battery element must be individually bonded by heat seal or the like. In the construction of this battery, at the top portion on the side from which the electrode terminals of the battery are electrically introduced and at the bottom portion on the opposite side, the sealed width is inevitably smaller, and therefore moisture easily enters the battery from these portions, causing a problem in that the battery life is shortened or the battery performance becomes poor.

Accordingly, it is desired to provide a battery pack which is not only thin and has both excellent volume efficiency and predetermined battery strength, but also in that it has excellent sealing properties and excellent heat radiation properties.

SUMMARY

In a first embodiment, a battery pack having a battery element is provided, wherein the battery pack includes: a generator device having the battery element disposed on a flexible covering material, the flexible covering material being folded to cover the battery element, wherein the three sides of the flexible covering material around the battery element are sealed; a rigid covering material for covering the generator device, the rigid covering material having an opening and being bonded to the flexible covering material of the generator device; and a cover fitted into the opening of the rigid covering material, wherein the rigid covering material has a four-layer structure having an outer packaging layer, a metal layer, an inner packaging layer, and a heat-bonding layer which are stacked on one another, and wherein the heat-bonding layer is at least one material selected from the group consisting of an ethylene-vinyl acetate copolymer, an ethylene-acrylic acid copolymer, an ethyl acrylate copolymer, a methyl acrylate copolymer, a methacrylic acid copolymer, a methyl methacrylate copolymer, polyacrylonitrile, an ethylene vinyl alcohol resin, a polyamide resin, a polyester resin, acid-modified polypropylene, and an ionomer.

In a second embodiment, a battery pack having a battery element is provided. The battery pack includes: a generator device having the battery element disposed on a flexible covering material, the flexible covering material being folded to cover the battery element, wherein the three sides of the flexible covering material around the battery element are sealed; a rigid covering material for covering the generator device, the rigid covering material having an opening and being bonded to the flexible covering material of the generator device; and a cover fitted into the opening of the rigid covering material, wherein the rigid covering material has a three-layer structure having an outer packaging layer, a metal layer, and a heat-bonding layer which are stacked on one another, and wherein the heat-bonding layer is at least one material selected from the group consisting of an ethylene-vinyl acetate copolymer, an ethylene-acrylic acid copolymer, an ethyl acrylate copolymer, a methyl acrylate copolymer, a methacrylic acid copolymer, a methyl methacrylate copolymer, polyacrylonitrile, an ethylene vinyl alcohol resin, a polyamide resin, a polyester resin, acid-modified polypropylene, and an ionomer.

In a first embodiment, by virtue of having the heat-bonding layer as the innermost layer of the four-layer structure, the rigid covering material achieves improved adhesion to the flexible covering material without using a separate bonding member. In addition, by virtue of having the inner packaging layer and the heat-bonding layer, the rigid covering material can be advantageously bonded to each of the flexible covering material and the cover.

In a second embodiment, by virtue of having the three-layer structure in which the heat-bonding layer constitutes the innermost layer of the rigid covering material and no inner packaging layer is formed, the rigid covering material can be advantageously bonded to each of the flexible covering material and the cover.

In each of the first and second embodiments, the adhesion of the flexible covering material to the rigid covering material and the adhesion of the rigid covering material to the cover are each improved. In addition, the generator device covered with the flexible covering material is further covered with the rigid covering material, and therefore the battery back has high sealing properties, thus reducing moisture from going into the generator device. Further, the rigid covering material formed mainly of a metal constitutes the outermost layer of the battery, and hence the battery back has excellent heat radiation properties.

The embodiments have a battery pack which is advantageous not only in that it is thin and has both excellent volume efficiency and predetermined battery strength, but also in that it has excellent sealing properties and excellent heat radiation properties and can maintain high battery performance.

Additional features and advantages are described herein, and will be apparent from, the following Detailed Description and the figures.

BRIEF DESCRIPTION OF THE FIGURES

The present disclosure will become more readily appreciated and understood from the following detailed description of embodiments and examples when taken in conjunction with the accompanying drawings, in which:

FIGS. 4A to 4C are diagrammatic views illustrating the construction of a battery described in JP 2005-166650;

DETAILED DESCRIPTION

Herein embodiments are described with reference to the accompanying drawings.

In a first embodiment, a battery pack having a construction using a rigid laminated film having a four-layer structure as the rigid covering material is described.

Figure 1:
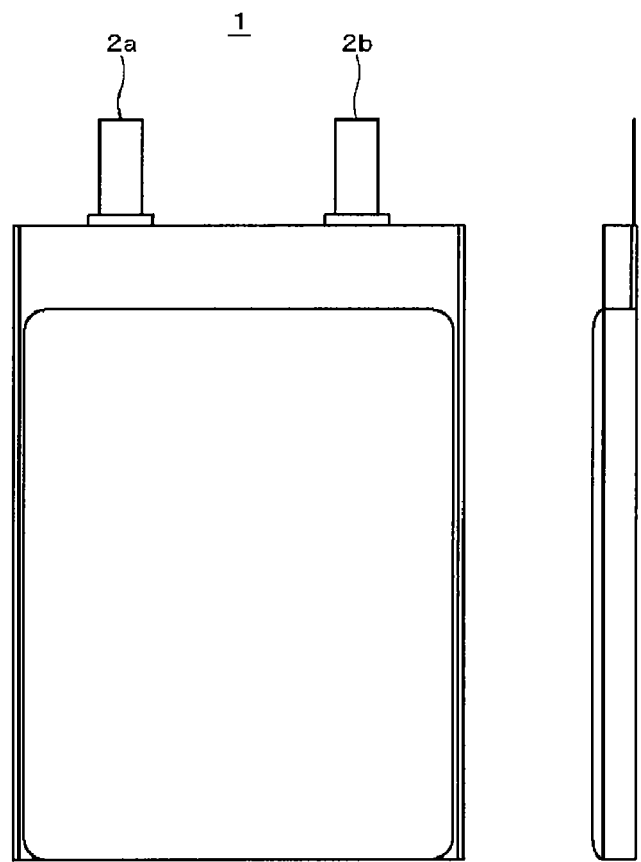
FIG. 1 is a diagrammatic view illustrating the construction of a battery described in TAKAMI Norio, "Ultra thin lithium-ion battery using aluminum laminated film case", Toshiba Review, Toshiba Corporation, Vol. 56 No. 2, February, 2001, pp. 10-13.
Figure 1:
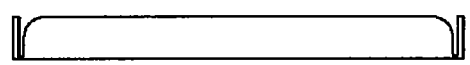
Figure 2:
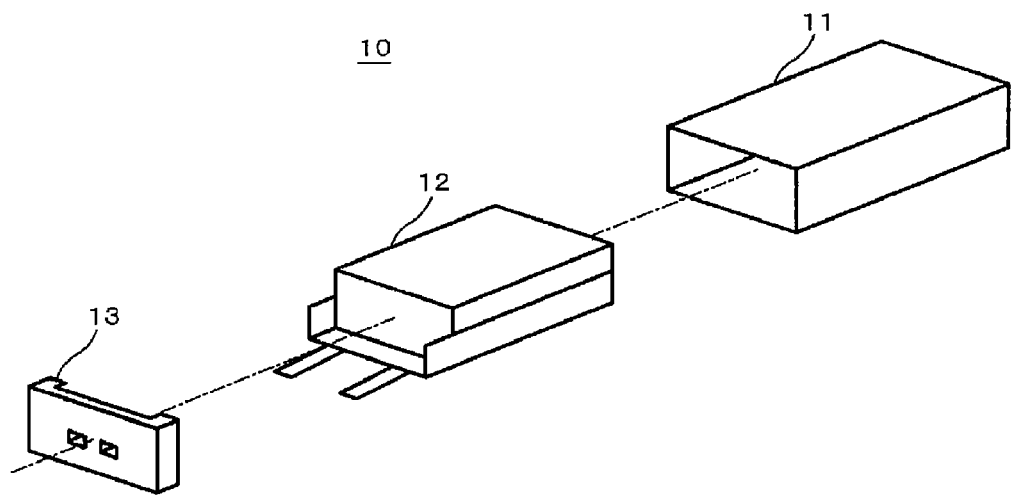
FIG. 2 is a diagrammatic view illustrating the construction of a battery described in JP 2003-303580.
Figure 3:
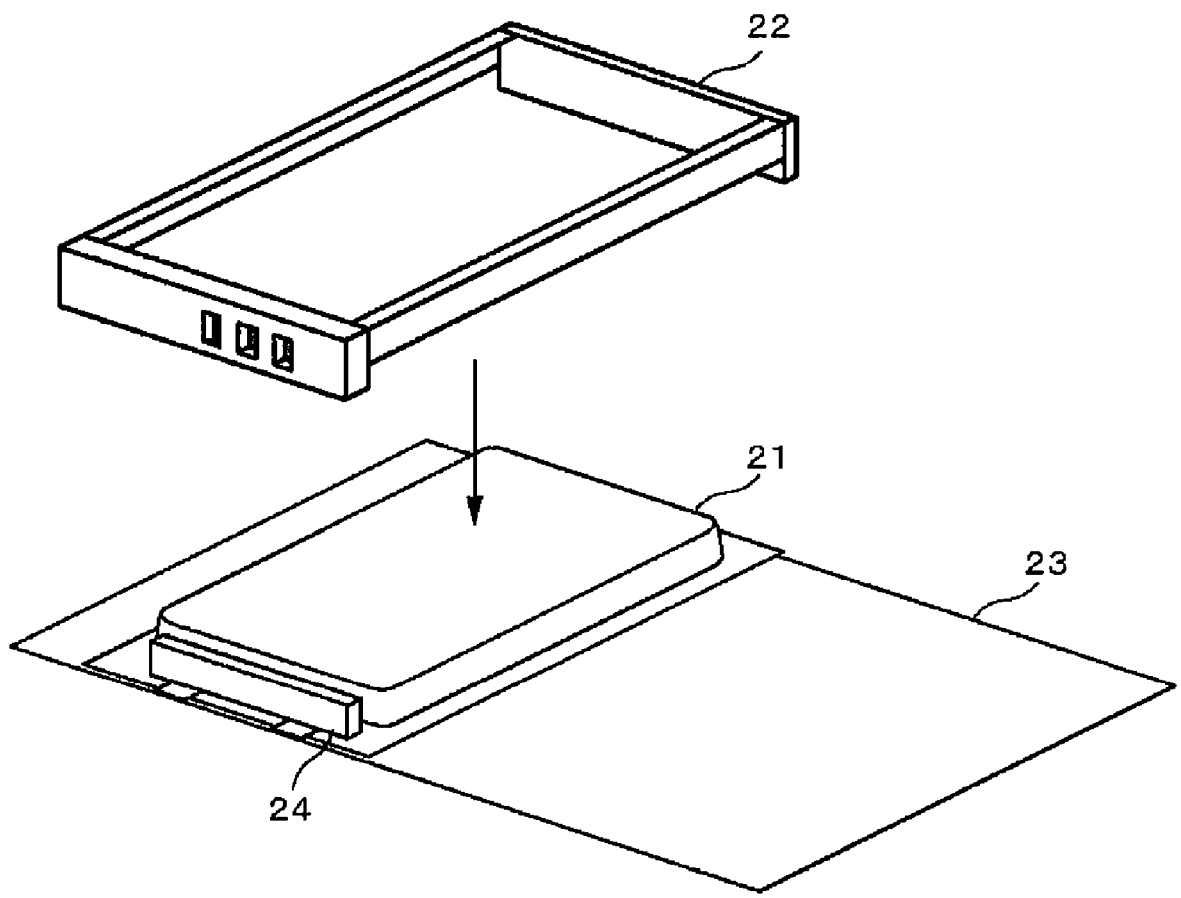
FIG. 3 is a diagrammatic view illustrating the construction of a battery described in JP 2004-165134.
Figure 5A:
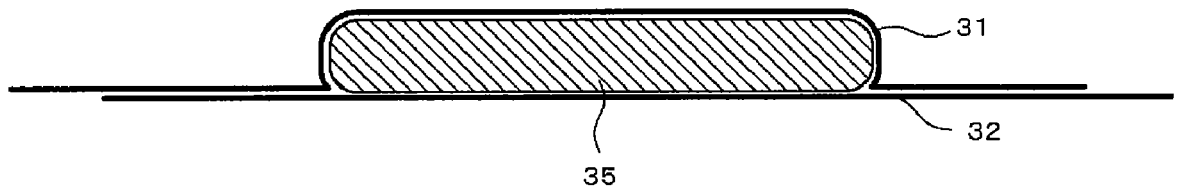
FIGS. 5A and 5B are diagrammatic views illustrating the construction of the battery described in JP 2005-166650.
Figure 5B:
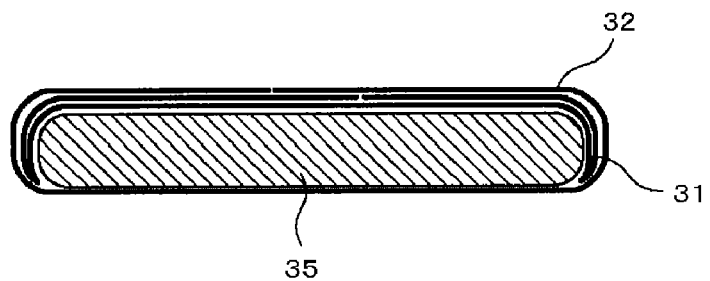
Figure 6:
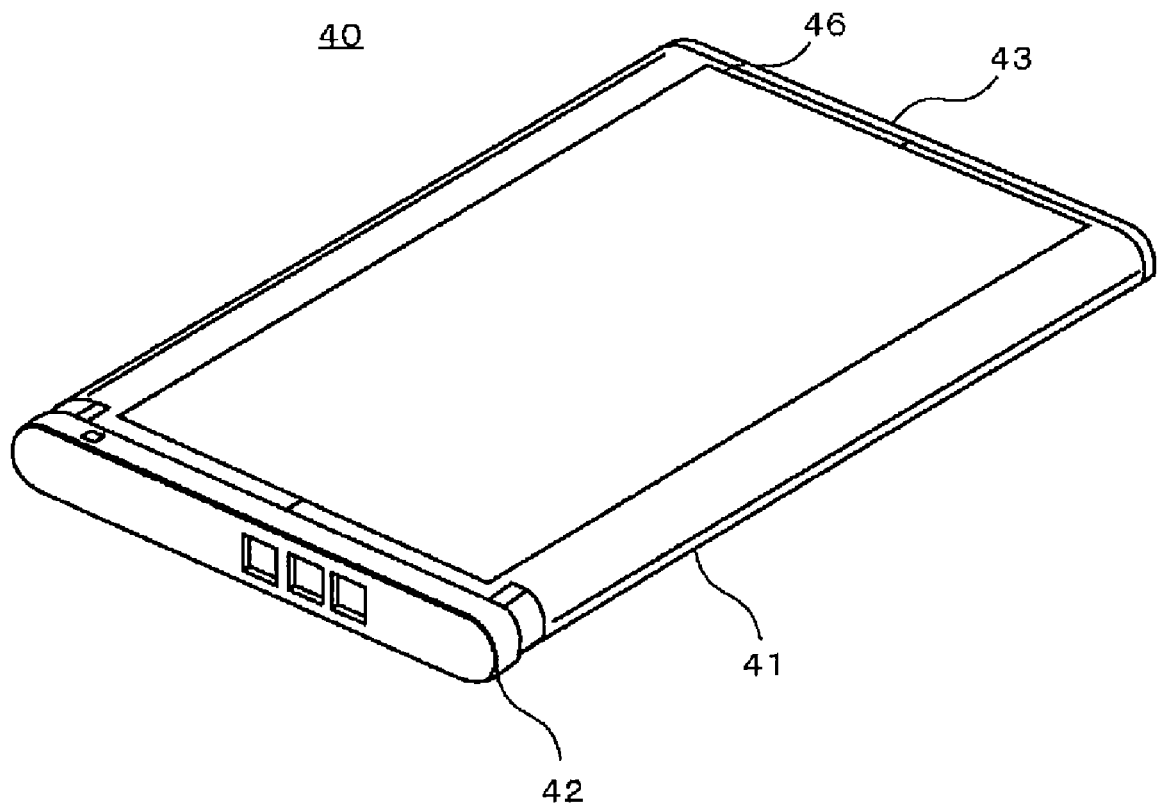
FIG. 6 is a diagrammatic view illustrating the construction of a battery pack according to one embodiment.

FIG. 6 shows the appearance of a battery pack according to one embodiment for use in a lithium ion polymer secondary battery. A battery pack 40 includes a generator device contained in a rigid laminated film 41 as a covering material, a top cover 42 and a rear cover 43 which are resin molded covers and fitted into the openings at both ends of the covering material, and optionally a product label 46.

In the present disclosure, a unit having the battery element covered with the flexible laminated film is referred to as "generator device", a unit having the generator device covered with the rigid laminated film 41 is referred to as "battery cell", and a unit having a construction shown in FIG. 6 having the battery cell having a circuit board connected thereto and the top cover 42 and rear cover 43 fitted to the battery cell is referred to as "battery pack".

Figure 7A:
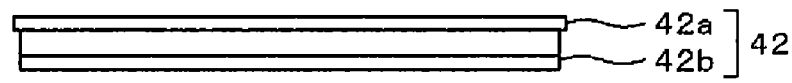
FIGS. 7A to 7C are diagrammatic views illustrating the construction of the battery pack according to one embodiment.
Figure 7B:
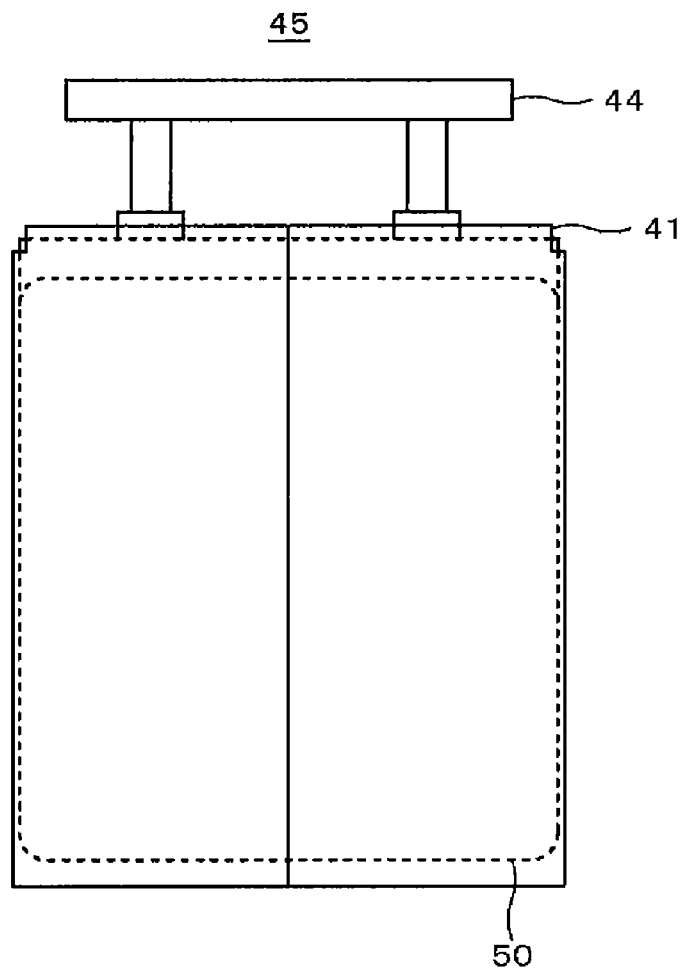
Figure 7C:
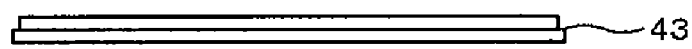

FIG. 7 shows the construction of the battery pack 40. The battery pack 40 includes a generator device 50 having a battery element covered with a flexible laminated film, a circuit board 44, a top cover 42, and a rear cover 43, and the generator device 50 covered with a rigid laminated film 41 constitutes a battery cell.

The top cover 42 is formed at a top portion from which a positive electrode and a negative electrode are electrically introduced, and is a resin molded cover fitted into an opening of the battery cell. The rear cover 43 is formed at a bottom portion of the battery, and is a resin molded cover fitted into an opening of the battery cell 45. The top cover 42 and rear cover 43 are fitted into the openings of the battery cell 45 and then bonded to the battery cell 45 by heat seal or the like. The top cover 42 includes an upper holder 42a and a lower holder 42b fitted to each other, and the circuit board 44 is disposed between the upper holder 42a and the lower holder 42b.

The circuit board 44 has a protection circuit preliminarily mounted thereon, and the protection circuit is connected by resistance welding, ultrasonic welding, or the like to a positive electrode terminal and a negative electrode terminal electrically introduced from the generator device 50. The protection circuit has a temperature protecting element for cutting off the current circuit in the battery when the temperature of the battery elevates, such as a positive temperature coefficient element (PTC element) or a thermistor.

The battery element is described bellow.

Figure 8:
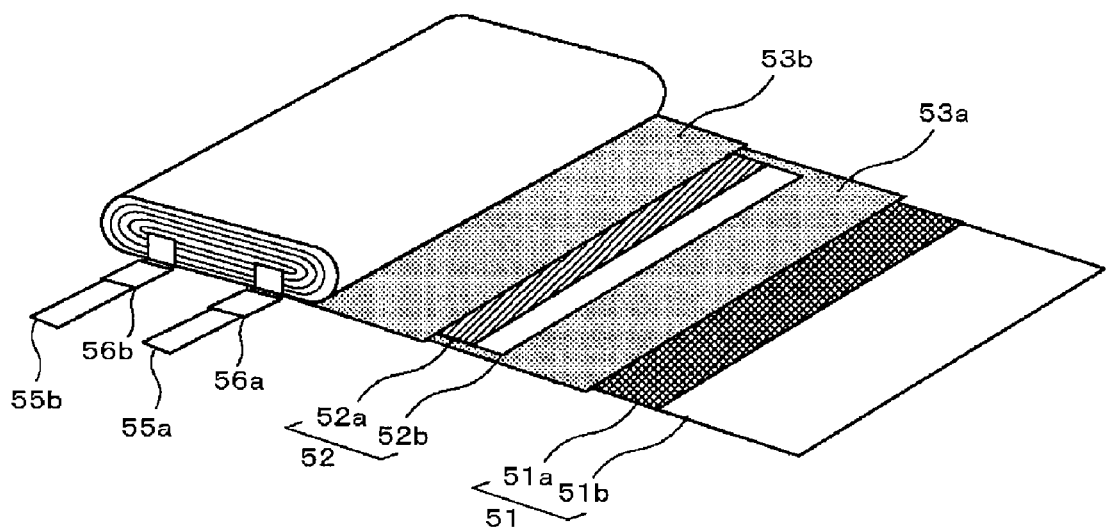
FIG. 8 is a diagrammatic view illustrating the construction of a battery element in one embodiment.

FIG. 8 shows the construction of a battery element 59 used in the battery pack 40. The battery element 59 includes a strip positive electrode 51, a separator 53a, a strip negative electrode 52 disposed so that it faces the positive electrode 51, and a separator 53b, which are stacked on one another in this order and spirally wound together in the longitudinal direction, and a gel electrolyte (not shown) is formed on both surfaces of the positive electrode 51 and the negative electrode 52. A positive electrode terminal 55a connected to the positive electrode 51 and a negative electrode terminal 55b connected to the negative electrode 52 (hereinafter, the electrode terminal is referred to as "electrode terminal 55" unless otherwise specified) are electrically introduced from the battery element 59, and both surfaces of each of the positive electrode terminal 55a and the negative electrode terminal 55b are individually covered with resin leaves 56a, 56b for improving the adhesion to the laminated film which subsequently covers the battery element. When an electrolytic solution is used, a step for charging the electrolytic solution is subsequently provided.

Hereinbelow, the materials for the battery element 59 are described in detail.

Positive Electrode

The positive electrode 51 includes a cathode active material layer 51a containing a cathode active material formed on both sides of a positive electrode current collector 51b. The positive electrode current collector 51b is configured to include a metallic foil, such as an aluminum (Al) foil, a nickel (Ni) foil, or a stainless steel (SUS) foil.

The cathode active material layer 51a includes, for example, a cathode active material, a conductor, and a binder. They are intimately mixed with each other to prepare a positive electrode composition, and the positive electrode composition is dispersed in a solvent to form slurry. Then, the resultant slurry is uniformly applied to the positive electrode current collector 51b by a doctor blade method or the like, and dried at a high temperature to remove the solvent, thus forming the cathode active material layer 51a. The amounts of the cathode active material, conductor, binder, and solvent may be arbitrary as long as they are uniformly dispersed.

As the cathode active material, a compound oxide of lithium and a transition metal, including mainly $Li_xMO_2$ (wherein M represents at least one transition metal, and x varies depending on the charged or discharged state of the battery, and is generally 0.05 to 1.10), is used. As the transition metal constituting the lithium compound oxide, cobalt (Co), Ni, or manganese (Mn) is used.

Specific examples of the lithium compound oxides include $LiCoO_2$, $LiNiO_2$, $LiMn_2O_4$, and $LiNi_yCo_{1-y}O_2$ (0<y<1). A solid solution obtained by replacing part of the transition metal element in the lithium compound oxide by another element can be used. Examples of the solid solutions include $LiNi_{0.5}Co_{0.5}O_2$ and $LiNi_{0.8}Co_{0.2}O_2$. These lithium compound oxides can generate high voltage and have excellent energy density. Alternatively, as the cathode active material, a metal sulfide or oxide containing no lithium, such as $TiS_2$, $MoS_2$, $NbSe_2$, or $V_2O_5$, may be used.

As the conductor, a carbon material, such as carbon black or graphite, is used. As the binder, for example, polyvinylidene fluoride, polytetrafluoroethylene, or polyvinylidene fluoride is used. As the solvent, for example, N-methylpyrrolidone is used.

The positive electrode 51 has the positive electrode terminal 55a joined to one end of the positive electrode current collector 51b by spot welding or ultrasonic welding. It is desired that the positive electrode terminal 55a is formed of a metallic foil or mesh, but the positive electrode terminal may be formed of any material other than metals as long as it is electrochemically and chemically stable and electrically conductive. As an example of the material for the positive electrode terminal 55a, there can be mentioned Al.

Negative Electrode

The negative electrode 52 includes an anode active material layer 52a containing an anode active material formed on both sides of a negative electrode current collector 52b. The negative electrode current collector 52b is formed of a metallic foil, such as a copper (Cu) foil, an Ni foil, or a stainless steel foil.

The anode active material layer 52a includes, for example, an anode active material and, if necessary, a conductor and a binder. They are intimately mixed with each other to prepare a negative electrode composition, and the negative electrode composition is dispersed in a solvent to form slurry. Then, the resultant slurry is uniformly applied to the negative electrode current collector 52b by a doctor blade method or the like, and dried at a high temperature to remove the solvent, thus forming the anode active material layer 52a. The amounts of the anode active material, conductor, binder, and solvent may be arbitrary as long as they are uniformly dispersed.

As the anode active material, lithium metal, a lithium alloy, a carbon material capable of being doped with lithium and dedoped, or a composite material of a metal material and a carbon material is used. Specifically, examples of carbon materials capable of being doped with lithium and dedoped include graphite, hardly graphitizable carbon, and easily graphitizable carbon, and, more specifically, a carbon material, such as pyrolytic carbon, coke (pitch coke, needle coke, or petroleum coke), graphite, glassy carbon, a calcined product of an organic polymer compound (obtained by carbonizing a phenolic resin, a furan resin, or the like by calcination at an appropriate temperature), carbon fiber, or activated carbon, can be used. Further, as a material capable of being doped with lithium and dedoped, a polymer, such as polyacetylene or polypyrrole, or an oxide, such as $SnO_2$, can be used.

As a material capable of being alloyed with lithium, a variety types of metals can be used, but tin (Sn), cobalt (Co), indium (In), Al, silicon (Si), or an alloy thereof is generally used. When using metallic lithium, it is not always necessary to mix lithium powder with a binder to form a coating film, and a rolled Li metal sheet can be used.

As the binder, for example, polyvinylidene fluoride or a styrene-butadiene rubber is used. As the solvent, for example, N-methylpyrrolidone or methyl ethyl ketone is used.

Like the positive electrode 51, the negative electrode 52 has the negative electrode terminal 55b joined to one end of the negative electrode current collector 52b by spot welding or ultrasonic welding. It is desired that the negative electrode terminal 52b is formed of a metallic foil or mesh, but the negative electrode terminal may be formed of any material other than metals as long as it is electrochemically and chemically stable and electrically conductive. As examples of the materials for the negative electrode terminal 52b, there can be mentioned Cu and Ni.

It is preferred that the positive electrode terminal 55a and the negative electrode terminal 55b are electrically introduced from the same side, but they may be electrically introduced from any sides as long as short-circuiting or the like does not occur and there is no adverse effect on the battery performance. With respect to the joint of the positive electrode terminal 55a and negative electrode terminal 55b, the joint position and the method for the joint are not limited to the examples mentioned above as long as electrical contact can be made.

Electrolyte

In the electrolyte, an electrolyte salt and a nonaqueous solvent generally used in a lithium ion battery can be used. Specific examples of nonaqueous solvents include ethylene carbonate (EC), propylene carbonate (PC), γ-butyrolactone, dimethyl carbonate, diethyl carbonate, ethylmethyl carbonate, dipropyl carbonate, ethylpropyl carbonate, and solvents obtained by replacing hydrogen in the above carbonate by a halogen. These solvents may be used individually or in combination with a predetermined formulation.

As the electrolyte salt, one soluble in the above nonaqueous solvent is used, and the electrolyte salt includes a combination of a cation and an anion. As a cation, an alkali metal or an alkaline earth metal is used. As an anion, $Cl^-$, $Br^-$, $I^-$, $SCN^-$, $ClO_4^-$, $BF_4^-$, $PF_6^-$, or $CF_3SO_3^-$ is used. Specific examples include $LiPF_6$, $LiBF_4$, $LiN(CF_3SO_2)_2$, $LiN(C_2F_5SO_2)_2$, and $LiClO_4$. With respect to the electrolyte salt concentration, there is no particular limitation as long as the electrolyte salt can be dissolved in the solvent, but it is preferred that the lithium ion concentration in the nonaqueous solvent is in the range of from 0.4 to 2.0 mol/kg.

When using a gel electrolyte, an electrolytic solution containing an electrolyte and an electrolyte salt is gelled with a matrix polymer to obtain a gel electrolyte. As the matrix polymer, there can be used any polymer which is compatible with the nonaqueous electrolytic solution including an electrolyte salt dissolved in a nonaqueous solvent and which can be gelled. Examples of the matrix polymers include polymers containing polyvinylidene fluoride, polyethylene oxide, polypropylene oxide, polyacrylonitrile, or polymethacrylonitrile in the repeating units. These polymers may be used individually or in combination.

Separator

A separator includes, for example, a porous film formed of a polyolefin material, such as polypropylene (PP) or polyethylene (PE), or a porous film formed of an inorganic material, such as ceramic nonwoven fabric, and the separator may have a stacked structure having two or more types of the porous films. Especially, a porous film of polyethylene or polypropylene is the most preferred.

Generally, the usable separator preferably has a thickness of 5 to 50 μm, more preferably 7 to 30 μm. When the separator has too large a thickness, the amount of the active material packed is reduced to lower the battery capacity, and further the ion conductivity is lowered, so that the current properties become poor. On the other hand, when the separator has too small a thickness, the mechanical strength of the separator film is reduced.

Preparation of Generator Device

Next, using the positive electrode 51 and negative electrode 52 having gel electrolyte layers formed, the positive electrode 51, the separator 53a, the negative electrode 52, and the separator 53b are stacked on one another in this order and spirally wound together, and the above-prepared gel electrolyte is uniformly applied the positive electrode 51 and negative electrode 52, thus forming the battery element 59.

Figure 9:
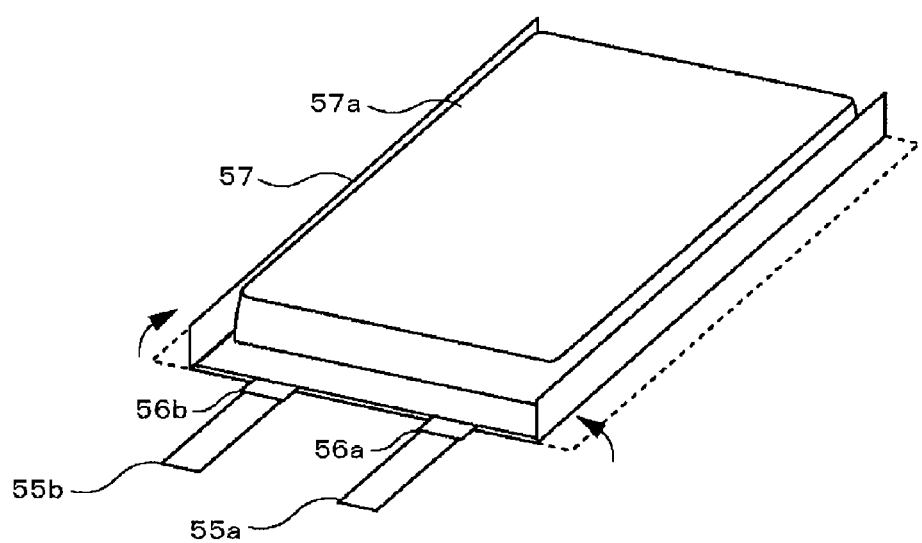
FIG. 9 is a diagrammatic view illustrating the construction of a generator device in one embodiment.

Then, the battery element 59 is covered with a flexible laminated film 57, and the film is molded to form a generator device 50 shown in FIG. 9.

Figure 10:
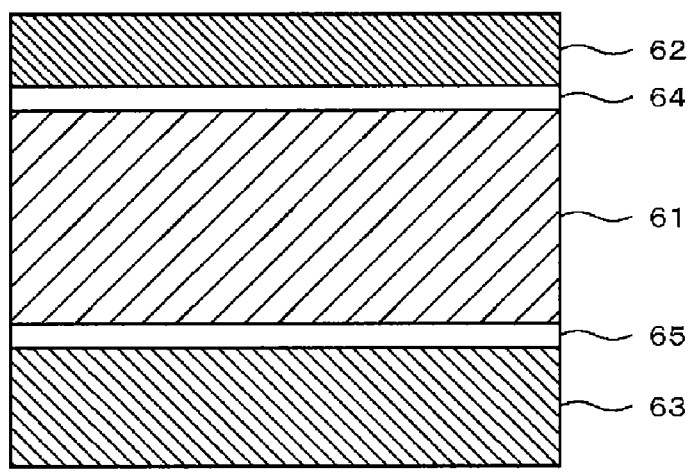
FIG. 10 is a cross-sectional view illustrating the construction of a flexible laminated film in one embodiment.

As the flexible laminated film 57, a laminated film having the construction shown in FIG. 10 can be used. The flexible laminated film 57 is configured by a multilayer film having a moisture resistance and insulation properties, and including a metallic foil designated by reference numeral 61 disposed between an outer packaging layer 62 formed of a resin film and an inner packaging layer (hereinafter, frequently referred to as "sealant layer") 63 formed of a resin film.

In the metal layer 61, a soft metal material is used, and improves the covering material in strength and prevents moisture, oxygen, or light from going into the battery to protect the contents of the battery. As the soft metal material, aluminum is the most preferred from the viewpoint of the weight, extensibility, cost, and processability, and especially aluminum 8021O or 8079O is preferred. The metal layer 61 and the outer packaging layer 62, and the metal layer 61 and the sealant layer 63 are, respectively, bonded together through bonding layers 64, 65. The bonding layer 64 may be omitted if necessary.

In the outer packaging layer 62, a polyolefin resin, a polyamide resin, a polyimide resin, or polyester is used from the viewpoint of achieving excellent appearance, toughness, and flexibility. Specifically, nylon (Ny), polyethylene terephthalate (PET), polyethylene naphthalate (PEN), polybutylene terephthalate (PBT), or polybutylene naphthalate (PBN) is used, and these can be used in combination.

The sealant layer 63 constitutes a portion to be melted by heat or ultrasonic waves and bonded, and polyethylene (PE), cast polypropylene (CPP), polyethylene terephthalate (PET), nylon (Ny), low-density polyethylene (LDPE), high-density polyethylene (HDPE), or linear low-density polyethylene (LLDPE) can be used, and these can be used in combination.

The commonest construction of the laminated film is as follows: outer packaging layer/metallic foil/sealant layer=Ny/Al/CPP. Alternatively, the following other common constructions of the laminated film can be employed: outer packaging layer/metallic film/sealant layer=Ny/Al/PE, PET/Al/CPP, PET/Al/PET/CPP, PET/Ny/Al/CPP, PET/Ny/Al/Ny/CPP, PET/Ny/Al/Ny/PE, Ny/PE/Al/LLDPE, PET/PE/Al/PET/LDPE, or PET/Ny/Al/LDPE/CPP. As the metallic foil, a metal other than Al can be used.

Figure 11:
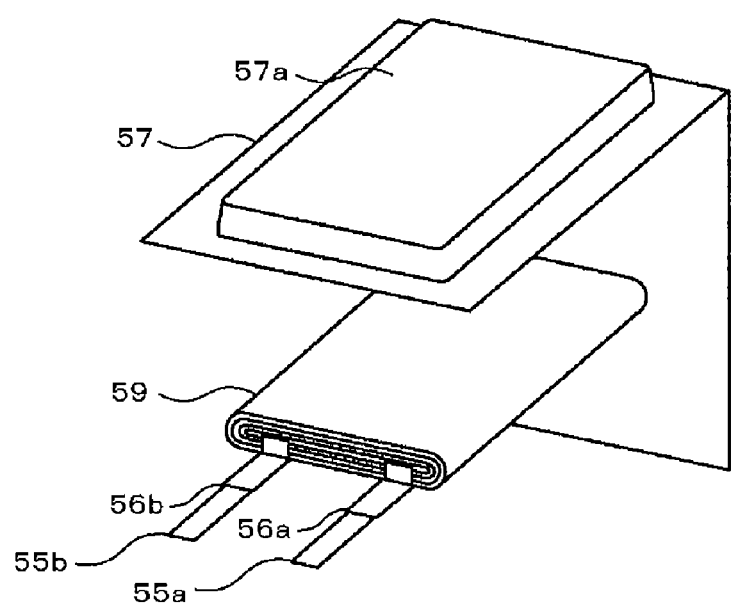
FIG. 11 is a diagrammatic view illustrating the construction of a generator device in one embodiment.

As shown in FIG. 11, the flexible laminated film 57 is subjected to deep draw to form a recess portion 57a, and the battery element 59 is contained in the recess portion 57a, and then the flexible laminated film 57 is folded so that the flexible laminated film 57 covers the opening of the recess portion 57a. Then, excluding the folded side, the three sides of the laminated film around the battery element 59 are heat-sealed under a reduced pressure to form the generator device 50.

In the battery using an electrolytic solution, the electrolytic solution is charged in this instance. The two sides of the laminated film around the battery element, excluding the folded side, are first heat-sealed, and then a predetermined amount of the electrolytic solution is charged through the unsealed opening, and finally the opening is sealed up by heat seal, thus obtaining the generator device.

Figure 12A:
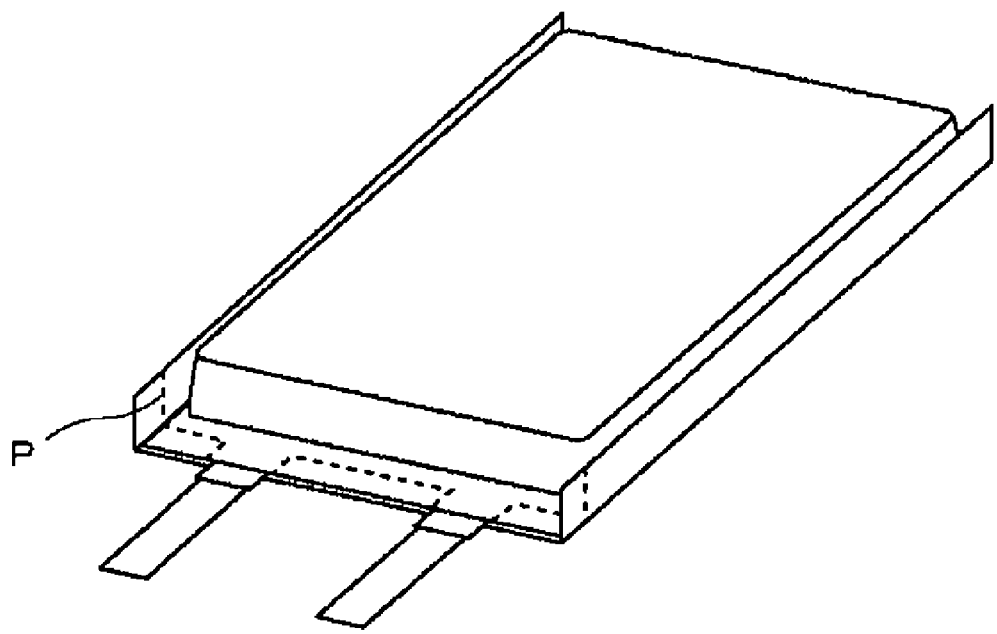
FIGS. 12A and 12B are diagrammatic views illustrating the construction of the generator device in one embodiment.
Figure 12B:
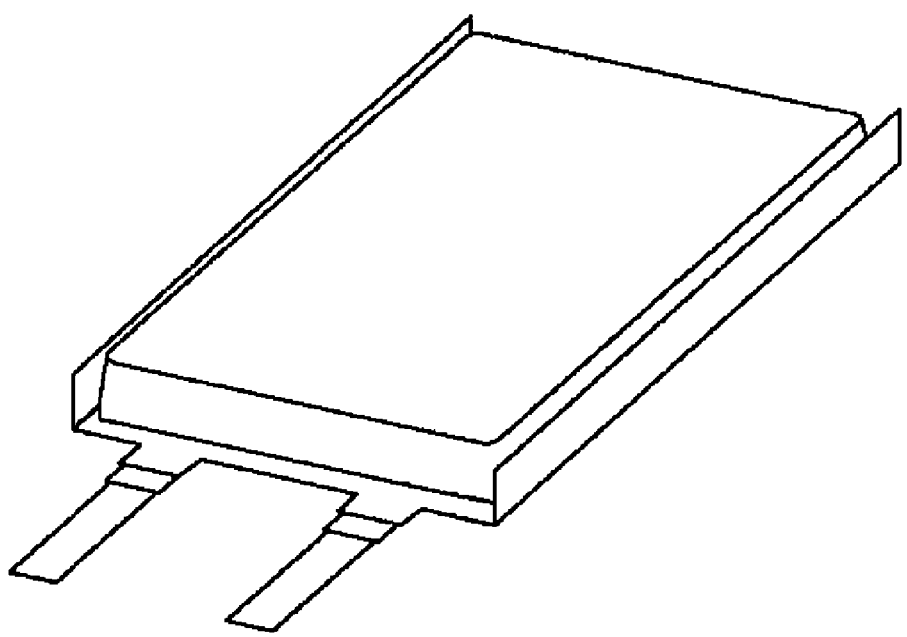

Considering the subsequent steps in the fabrication process, the unnecessary portion of the top portion of the generator device 50 may be removed by trimming. As shown in FIGS. 12A and 12B, trimming along a dotted line indicated by character P can reduce, for example, interference between the top cover and the flexible laminated film.

Preparation of Battery Cell

The thus prepared generator device is covered with a rigid laminated film 41 to form the battery cell 45. The construction of the rigid laminated film 41 is first described.

Figure 13:
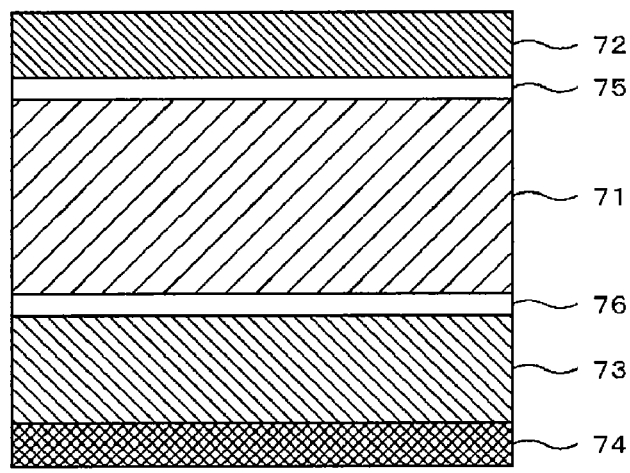
FIG. 13 is a diagrammatic view illustrating the construction of a rigid laminated film in one embodiment.

As shown in FIG. 13, the rigid laminated film 41 is configured by a multilayer film having a moisture resistance and insulation properties, and including a metallic foil designated by reference numeral 71 disposed between an outer packaging layer 72 formed of a resin film and a sealant layer 73 formed of a resin film, and a heat-bonding layer 74 on the sealant layer 73.

In the metal layer 71, a hard metal material is used, and a material appropriately selected from aluminum, stainless steel, or iron plated with copper, titanium, tin, zinc, or nickel can be used. Of these, aluminum (Al) or austenite stainless steel is the most preferred, and especially aluminum 3003-H18, 3004-H18, or 1N30-H18 or stainless steel SUS304 is preferably used.

In the outer packaging layer 72, a polyolefin resin, a polyamide resin, a polyimide resin, or polyester is used from the viewpoint of achieving excellent appearance, toughness, and flexibility. Specifically, nylon (Ny), polyethylene terephthalate (PET), polyethylene naphthalate (PEN), polybutylene terephthalate (PBT), or polybutylene naphthalate (PBN) is used, and these can be used in combination.

The sealant layer 73 constitutes a portion to be melted by heat or ultrasonic waves and bonded, and polyethylene (PE), casted polypropylene (CPP), polyethylene terephthalate (PET), nylon (Ny), low-density polyethylene (LDPE), high-density polyethylene (HDPE), or linear low-density polyethylene (LLDPE) can be used, and these can be used in combination.

The heat-bonding layer 74 bonds the generator device 50 covered with the flexible laminated film 57 to the rigid laminated film 41 without a separate bonding member. As the heat-bonding layer 74, a resin material having excellent adhesion to Ny, PET, or PEN used in the outer packaging layer in the flexible laminated film 57 and having a melting temperature which does not adversely affect the battery element is used. In addition, the resin material used as the heat-bonding layer 74 has a melting point lower than that of the material used in the sealant layer 73.

Specifically, an ethylene vinyl alcohol resin (EVA), acid-modified polypropylene, an ethylene-vinyl acetate copolymer, an ethylene-acrylic acid copolymer, an ethyl acrylate copolymer, a methyl acrylate copolymer, a methacrylic acid copolymer, a methyl methacrylate copolymer, polyacrylonitrile, a polyamide resin, a polyester resin, or an ionomer can be used, and these can be used in combination. The heat-bonding layer 74 can be formed using a method in which the above material in a film form is stacked on the sealant layer, a method in which the resin material melted by heat (hot-melt resin) is applied to the sealant layer and then cooled, or a method in which the hot-melt resin is diluted with a solvent and applied to the sealant layer and then dried to remove the solvent.

In the rigid laminated film 41, the heat-bonding layer 74 has a thickness of about 1 to 5 µm. The metal layer 71 is used in the outermost layer of the battery pack 40 to secure the strength of the battery pack 40, and therefore has a thickness of about 50 to 100 µm. The outer packaging layer 72 has a thickness of about 9 to 15 µm, and the sealant layer 73 has a thickness of about 25 to 35 µm.

The sealant layer 73 serves as a bonding layer in the heat seal of the top cover 42 and rear cover 43 subsequently conducted. Therefore, as the sealant layer, a resin material having excellent adhesion to the top cover 42 and rear cover 43 is selected. In addition, the sealant layer exhibits a cushioning effect when bonding the rigid laminated film 41 to the generator device 50. Specifically, in bonding the flexible laminated film 57 which is a covering material for the generator device 50 to the rigid laminated film 41 through the heat-bonding layer 74 by heat seal, there is a possibility that the laminated films each having a finely uneven surface cannot be bonded together. When the sealant layer 73 having a thickness of about 25 to 35 µm is formed, the sealant layer 73 functions as cushioning, thus making it possible to advantageously bond together the laminated films each having a finely uneven surface.

Figure 14A:
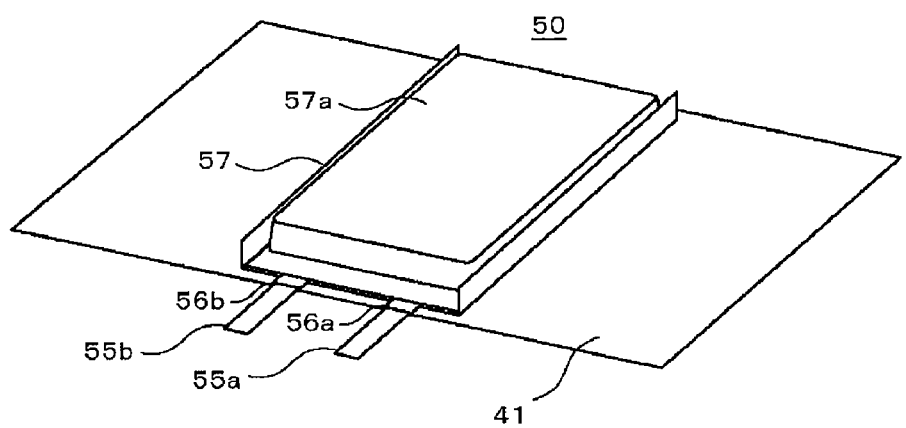
FIGS. 14A and 14B are diagrammatic views illustrating the construction of a battery cell in one embodiment.
Figure 14B:
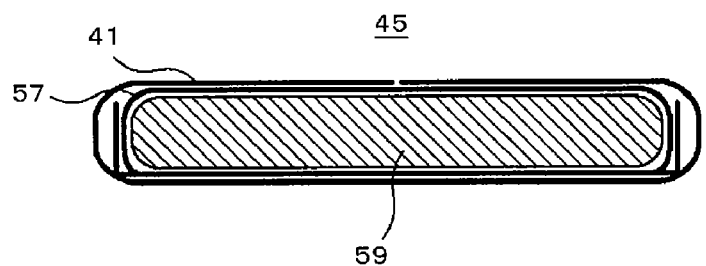

The covering material configured by the rigid laminated film 41 is bonded to the generator device 50. As shown in FIG. 14A, the rigid laminated film 41 is first folded so that it covers the generator device 50 and the ends of the rigid laminated film 41 are joined on the top surface of the generator device 50. Then, the top surface and bottom surface of the generator device 50 are heated, while pressing, by heater blocks to a temperature at which the resin material of the heat-bonding layer 74 is melted. The resin material of the heat-bonding layer 74 is melted and serves as a bonding agent to bond the rigid laminated film 41 to the generator device 50, thus forming the battery cell 45 having a cross-section shown in FIG. 14B.

The temperature of the heater block varies depending on the resin material of the heat-bonding layer 74, but the temperature is equal to or higher than the melting temperature of the resin material of the heat-bonding layer 74 and lower than the melting temperature of the resin material used in the sealant layer 73. When the temperature of the heater block is in this range, only the resin material of the heat-bonding layer 74 is melted to achieve the above bonding without melting the resin material of the sealant layer 73.

The heating temperature higher than 120° C. possibly adversely affects the battery element 59. For example, the separators 53a, 53b used in the battery element 59 are generally made of polyethylene (PE) having a melting point of about 120° C., and hence the heating temperature higher than 120° C. possibly causes the battery to lower in the safety or function. For this reason, the upper limit of the heating temperature by the heater block is about 110° C.

The rigid laminated film 41 may have either the construction shown in FIG. 14 or any one of the constructions shown in FIGS. 15 to 19.

Figure 15A:
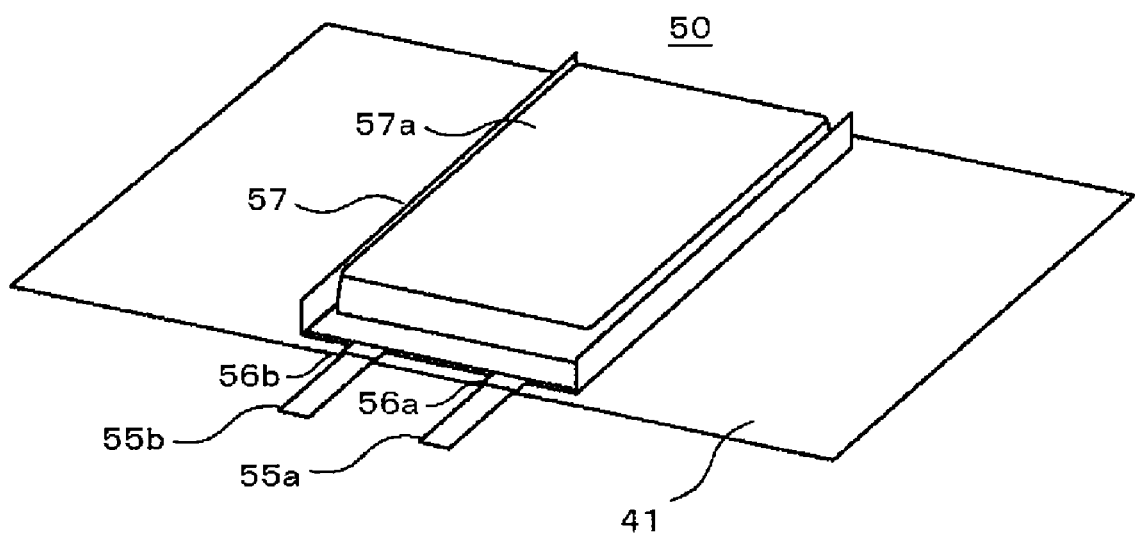
FIGS. 15A and 15B are diagrammatic views illustrating the construction of a battery cell in one embodiment.
Figure 15B:
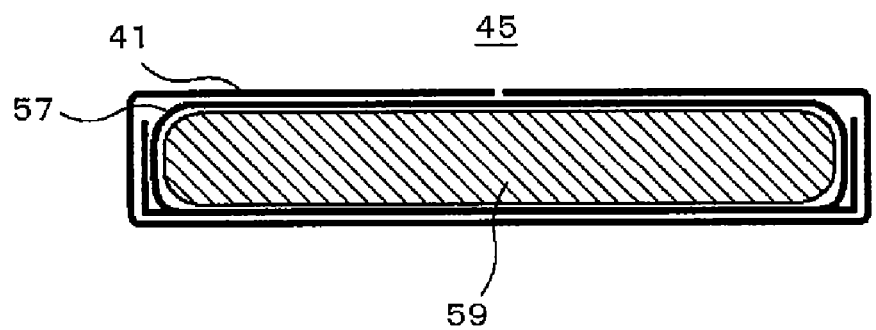

FIGS. 15A and 15B show a construction such that the rigid laminated film 41 is disposed so as to cover the bottom surface of the generator device 50 to form the battery cell 45, and the joint of the ends of the rigid laminated film 41 is positioned on the top surface of the battery cell 45. The battery cell in FIG. 14 has a shape of a rounded side portion, whereas the battery cell in FIG. 15 has a substantially rectangular cross-section.

Figure 16A:
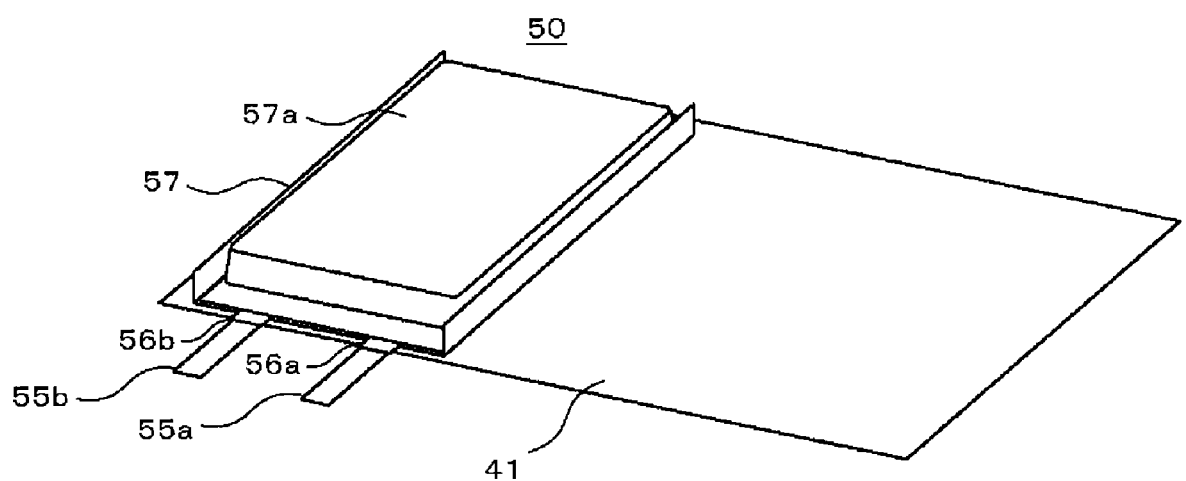
FIGS. 16A and 16B are diagrammatic views illustrating the construction of a battery cell in one embodiment.
Figure 16B:
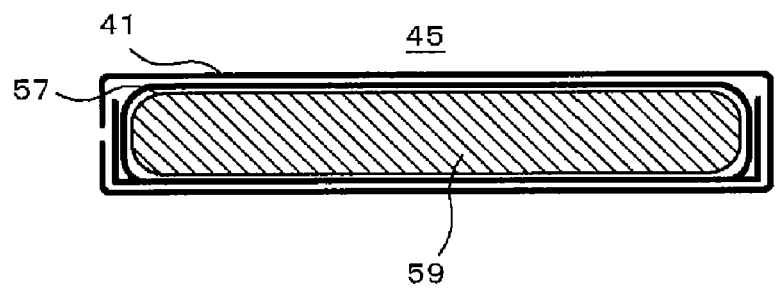

FIGS. 16A and 16B show a construction such that the rigid laminated film 41 is disposed so as to cover one side portion of the generator device 50 to form the battery cell 45, and the joint of the ends of the rigid laminated film 41 is positioned on one side portion of the battery cell 45.

Figure 17A:
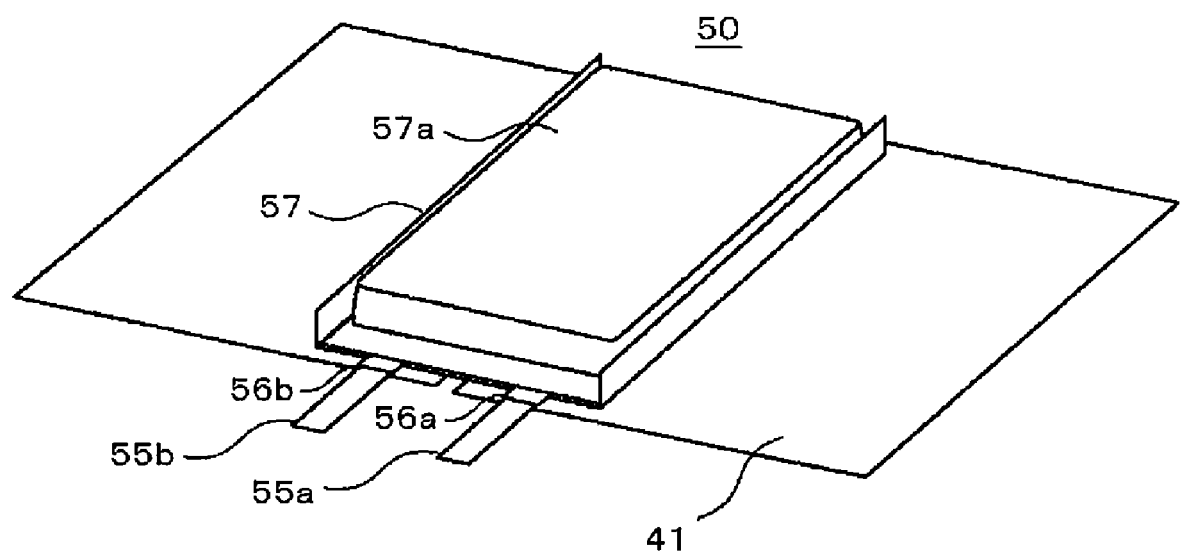
FIGS. 17A and 17B are diagrammatic views illustrating the construction of a battery cell in one embodiment.
Figure 17B:
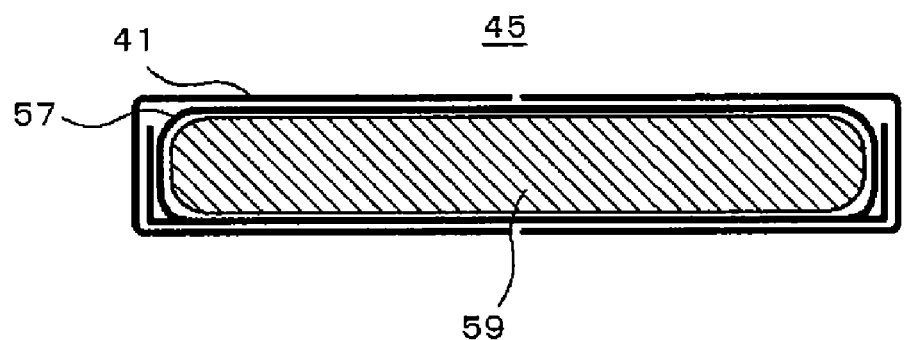

FIGS. 17A and 17B show a construction such that two rigid laminated films 41 are disposed so as to cover both side portions of the generator device 50 to form the battery cell 45, and the joints of the ends of the rigid laminated films 41 are positioned on the top surface and bottom surface of the battery cell 45.

Figure 18A:
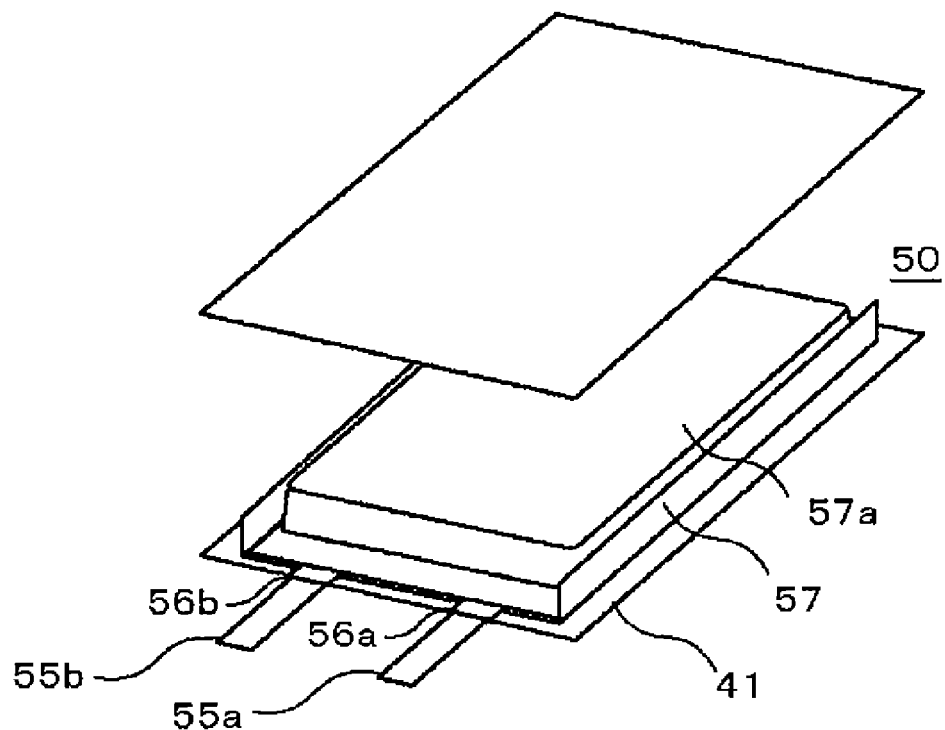
FIGS. 18A and 18B are diagrammatic views illustrating the construction of a battery cell in one embodiment.
Figure 18B:
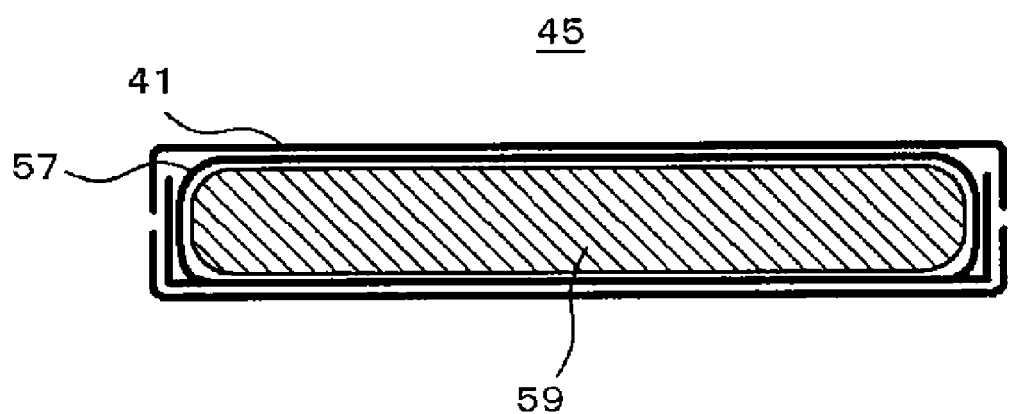

FIGS. 18A and 18B show a construction such that two rigid laminated films 41 are disposed so as to respectively cover the top surface and bottom surface of the generator device 50 to form the battery cell 45, and the joints of the ends of the rigid laminated films 41 are positioned on the both side portions of the battery cell 45.

Figure 19A:
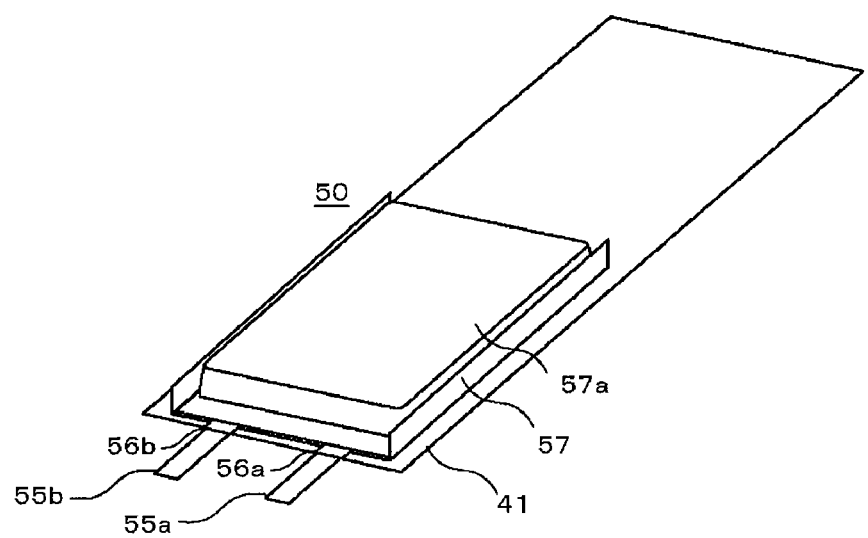
FIGS. 19A and 19B are diagrammatic views illustrating the construction of a battery cell in one embodiment.
Figure 19B:
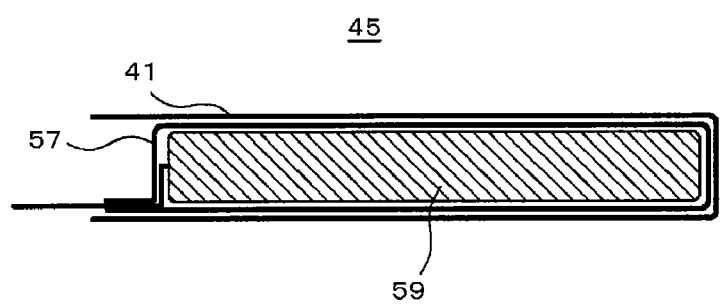

FIGS. 19A and 19B show a construction such that the rigid laminated film 41 is folded so as to cover the bottom portion of the generator device 50 to form the battery cell 45. FIG. 19B is a cross-sectional view as viewed from the side of the battery cell 45.

Fabrication of Battery Pack

Next, the circuit board 44 is connected to the positive electrode terminal 55a and negative electrode terminal 55b. The positive electrode terminal 55a and negative electrode terminal 55b electrically introduced from the top portion of the battery cell 45 molded into a predetermined shape are bonded by resistance welding, ultrasonic welding, or the like to the protection circuit preliminarily mounted on the circuit board 44. The circuit board 44 connected to the battery cell 45 is inserted into the top cover 42 having the upper holder 42a and lower holder 42b which are preliminarily molded and fitted to each other.

The circuit board 44 has mounted thereon a protection circuit having a temperature protecting element, such as a fuse, a PTC element, or a thermistor, an ID for identifying the battery pack, and a resistance, and further a plurality of contact portions are formed on the circuit board. In the protection circuit, an IC for monitoring the secondary battery and controlling a field effect transistor (FET), and a protection circuit including a charge-discharge control FET are used.

The PTC element is connected to the battery element in series, and, when the temperature of the battery is higher than the preset temperature, the PTC element rapidly increases in electric resistance to substantially cut off the electric current flowing to the battery. The fuse or thermistor is also connected to the battery element in series, and, when the temperature of the battery is higher than the preset temperature, it cuts off the electric current flowing to the battery. When the terminal voltage of the secondary battery exceeds 4.3 to 4.4 V, there is a danger that the battery suffers heat generation or ignition. Therefore, the protection circuit including an IC for monitoring the secondary battery and controlling the FET and a charge-discharge control FET monitors the voltage of the secondary battery and switches off the charge control FET to cut-off charging when the voltage exceeds 4.3 to 4.4 V. Further, when the secondary battery is over-discharged until the terminal voltage of the secondary battery becomes the discharge cut-off voltage or lower and the secondary battery voltage is 0 V, there is a possibility that the secondary battery suffers internal short-circuiting, making it impossible to recharge the battery. Therefore, the protection circuit monitors the secondary battery voltage and switches off the discharge control FET to cut-off discharging when the voltage is lower than the discharge cut-off voltage.

The circuit board 44 joined to the battery cell 45 is covered with both the upper holder 42a and lower holder 42b preliminarily shaped by injection molding, and the lower holder 42b is fitted to the upper holder 42a, so that the circuit board is contained in the top cover 42. Then, the top cover 42 is moved so that the lower holder 42b is near the battery cell 45, and the top cover 42 is fitted into the opening in the top portion of the battery cell 45 so that the positive electrode terminal 55a and negative electrode terminal 55b are bent in the battery cell 45.

Subsequently, the fitting portion of the top cover 42 to the battery cell 45 is heated by means of a heater head to bond the top cover 42 to the battery cell 45 by heat seal. In this instance, the temperature of the heater head is higher than the temperature in forming the battery cell and equal to or higher than the melting temperature of the resin material for the sealant layer 73, and therefore the top cover 42 is bonded not to the heat-bonding layer 74 but to the sealant layer 73.

The heat-bonding layer 74 heated in bonding the rigid laminated film 41 to the generator device 50 is pushed by the top cover 42 being fitted, and moved deep inside the battery cell 45. As mentioned above, the resin material having a melting temperature lower than that of the sealant layer 73 is used in the heat-bonding layer 74, and hence only the heat-bonding layer 74 is melted in bonding the rigid laminated film 41 to the generator device 50. Therefore, the heat-bonding layer 74 can be moved without moving the sealant layer 73 used for bonding the top cover 42, thus exposing the sealant layer 73.

In this instance, if necessary, a bonding agent or a hot-melt resin may be applied to the gap between the generator device 50 and the top cover 42. In this case, an inlet for the bonding agent or hot-melt resin is preliminarily formed in the top cover 42. By using the bonding agent or hot-melt resin, the adhesion of the battery cell 45 to the top cover 42 is further improved. When applying the hot-melt resin, care must be taken to prevent the circuit board 44 from suffering deformation or damage due to the heat of the resin.

Subsequently, the rear cover 43 is fitted to the bottom portion of the battery cell 45, and the fitting portion of the rear cover 43 to the battery cell 45 is heated by means of a heater head to bond the rear cover 43 to the battery cell 45 by heat seal. In this case, like in the top cover 42, the heat-bonding layer 74 is pushed by the rear cover 43 being fitted, and moved deep inside the battery cell 45, so that the rear cover 43 is bonded to the exposed sealant layer 73.

In this instance, like in the top cover 42, if necessary, a bonding agent or a hot-melt resin may be applied to the gap between the generator device 50 and the rear cover 43. Also in this case, an inlet for the bonding agent or hot-melt resin is preliminarily formed in the rear cover 43. The fitting step and the heat seal step for the top cover 42 and rear cover 43 may be performed at the same time.

Either a member preliminarily molded may be used as the rear cover 43, or a method may be used in which the battery cell 45 is placed in a mold and a hot-melt resin is charged to the bottom portion and molded integrally with the battery cell 45.

By forming, as an inside layer of the metal layer 71, the sealant layer 73 from a resin material having excellent adhesion to the top cover 42 and rear cover 43, and further forming, as an inside layer of the sealant layer 73, the heat-bonding layer 74 from a resin material having excellent adhesion to the outer packaging layer 62 in the flexible laminated film 57 and having a melting temperature lower than that of the sealant layer 73, the generator device 50 and the rigid laminated film 41, and the battery cell 45 and the top cover 42 and rear cover 43 can be respectively bonded together, thus obtaining the battery pack 40 having a construction unlikely to suffer breakage.

Finally, a product label is put on the battery pack so that the label covers the joint of the ends of the rigid laminated film 41 in the battery pack 40, thus obtaining the battery pack 40 shown in FIG. 6. The product label 46 is optionally put on the battery pack.

Figure 20:
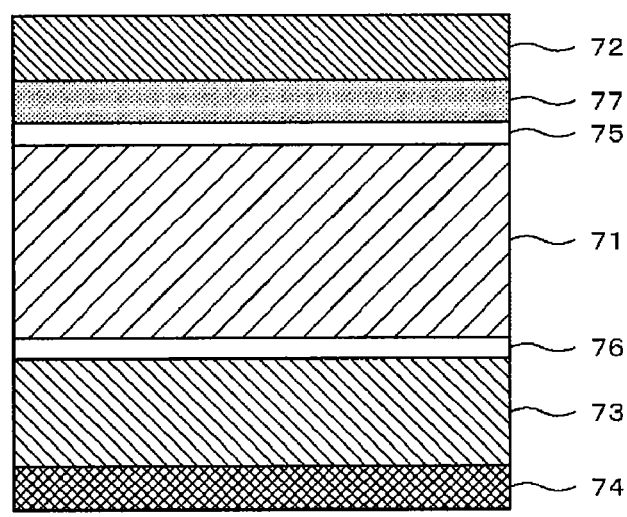
FIG. 20 is a diagrammatic view illustrating another example of the construction of the rigid laminated film.
Figure 21:
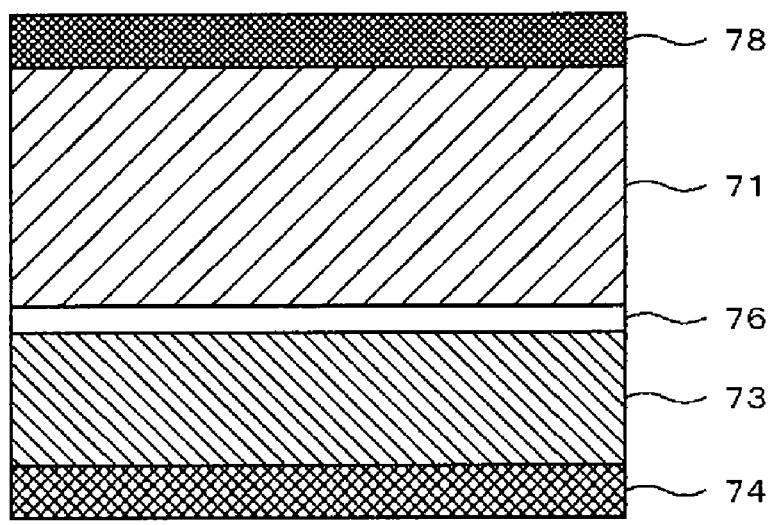
FIG. 21 is a diagrammatic view illustrating still another example of the construction of the rigid laminated film.

Instead of the product label 46, the rigid laminated film 41 can be subjected to printing or baking coating. For example, as shown in FIG. 20, a printing layer 77 on which desired patterns or characters are printed may be formed on the inner side (on the metallic foil side) of the outer packaging layer 72 in the rigid laminated film 41 so that the printed patterns or characters can be seen through the outer packaging layer 72. In this case, the inversed patterns or characters are printed. Alternatively, as shown in FIG. 21, a baking coat 78 may be formed using a laser or the like on the outer side of the metal layer 71. In this case, the rigid laminated film has a construction such that the outer packaging layer 72 in the rigid laminated film and the bonding layer 75 for bonding the outer packaging layer 72 to the metal layer 71 are not formed and the metal layer 71 having formed the baking coat 78 is exposed.

The thus produced battery pack 40 can secure external impact strength.

For example, in the battery pack described in JP 2005-166650, all the four sides around the battery element must be heat-sealed, and a problem arises in that moisture easily goes into the battery. By contrast, in the generator device in one present embodiment, only three sides, i.e., top portion and both side portions are heat-sealed. There is no need to seal the bottom portion in which the sealed width must be small, preventing a problem in that moisture goes into the battery.

Further, even when the battery using a metal material, such as a rigid laminated film, in the external packaging is penetrated with a nail, heat generation occurs only at the battery surface, and heat radiation is promoted, so that heat generation in the battery can be prevented, thus providing a safer battery pack.

(2) SECOND EMBODIMENT

In the second embodiment, a battery pack using a rigid laminated film having a three-layer structure as the rigid covering material is described.

The pack construction of the battery pack according to the second embodiment is similar to the construction of the first embodiment shown in FIGS. 6 and 7. Further, the battery element and generator device are similar to those in the first embodiment, and therefore the descriptions of them are omitted.

Preparation of Battery Cell

Figure 22:
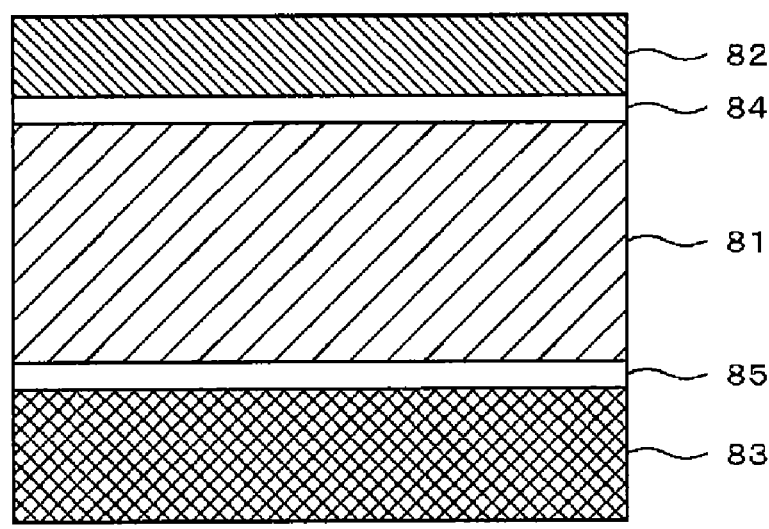
FIG. 22 is a diagrammatic view illustrating the construction of a rigid laminated film in one embodiment.

The generator device 50 is covered with a rigid laminated film 80 having a three-layer structure shown in FIG. 22 to form a battery cell. The construction of the rigid laminated film 80 is described first.

As shown in FIG. 22, the rigid laminated film 80 in the second embodiment is configured by a multilayer film having a moisture resistance and insulation properties, and including a metallic foil designated by reference numeral 81 disposed between an outer packaging layer 82 formed of a resin film and a heat-bonding layer 83.

As the materials for the metal layer 81 and outer packaging layer 82, materials the same as those in the first embodiment can be used.

The heat-bonding layer 83 bonds the generator device 50 covered with the flexible laminated film 57 to the rigid laminated film 80 without a separate bonding member. In the second embodiment, by using in the heat-bonding layer 83 a material having excellent adhesion to each of the resin material for the outer packaging layer 62 of the generator device 50, such as Ny, PET, or PEN, and the resin material for the top cover 42 and rear cover 43, such as PP, and having high reactivity, the battery pack can be produced without using the sealant layer 73 formed in the first embodiment.

As the material for the heat-bonding layer, specifically, acid-modified polypropylene, an ionomer resin, an ethylene-vinyl acetate copolymer, an ethylene-acrylic acid copolymer, an ethyl acrylate copolymer, a methyl acrylate copolymer, a methacrylic acid copolymer, a methyl methacrylate copolymer, polyacrylonitrile, an ethylene vinyl alcohol resin, polyamide, or polyester can be used, and, of these, acid-modified polypropylene, an ionomer resin, or an ethylene vinyl alcohol resin is especially preferred. These materials can be used as a hot-melt resin, a film, or a weathering resistant adhesive.

In the rigid laminated film 80 in the second embodiment, the heat-bonding layer 83 has a thickness of about 25 to 35 μm. The metal layer 81 and outer packaging layer 82 may have respective thicknesses equivalent to those in the first embodiment. In the first embodiment, the heat-bonding layer 74 in the rigid laminated film 41 has a thickness of 1 to 5 μm, but, in the second embodiment, the heat-bonding layer 83 has such a larger thickness that the heat-bonding layer 83 itself has a cushioning effect, thus improving the adhesion.

The covering material formed of the rigid laminated film 80 is bonded to the generator device 50. Like in the first embodiment, the rigid laminated film 80 is folded so that it covers the generator device 50 and the ends of the rigid laminated film 80 are joined on the top surface of the generator device 50. Then, the top surface and bottom surface of the generator device 50 are heated, while pressing, by heater blocks to a temperature at which the resin material of the heat-bonding layer 83 is melted. The resin material is melted and serves as a bonding agent to bond the rigid laminated film 80 to the generator device 50, thus forming the battery cell.

The temperature of the heater block varies depending on the resin material of the heat-bonding layer, but the temperature may be equal to or higher than the melting temperature of the resin material of the heat-bonding layer 83. The heating temperature of higher than 120° C. possibly adversely affects the battery element 59. From this point of view, it is desired that the upper limit of the heating temperature by the heater block is about 110° C.

Fabrication of Battery Pack

Next, the circuit board 44 is connected to the positive electrode terminal 55a and negative electrode terminal 55b. The method for connecting the circuit board 44 to the positive electrode terminal 55a and negative electrode terminal 55b is similar to that used in the first embodiment, and therefore the descriptions of this are omitted.

The top cover 42 containing the circuit board 44 is fitted into the opening in the top side of the battery cell 90. Then, the fitting portion of the top cover 42 is heated by means of a heater head to bond the top cover 42 to the battery cell 90 by heat seal. In the second embodiment, as the resin material for the heat-bonding layer 83, a resin material having excellent adhesion to the top cover 42 and rear cover 43 is used, and therefore the top cover 42 is bonded to the heat-bonding layer 83. Like the top cover 42, the rear cover 43 can be bonded to the battery cell 90.

In this instance, if necessary, a bonding agent or a warmed resin material (hot-melt resin) may be applied to the gap between the generator device 50 and the top cover 42. In this case, an inlet for the bonding agent or hot-melt resin is preliminarily formed in the top cover and rear cover. By using the bonding agent or hot-melt resin, the adhesion of the battery cell 90 to the top cover 42 and rear cover 43 is further improved. When applying the hot-melt resin from the top cover 42, care must be taken to prevent the circuit board from suffering deformation or damage due to the heat of the resin.

Either a member preliminarily molded may be used as the rear cover 43, or a method may be used in which the battery cell 90 is placed in a mold and a hot-melt resin is charged to the bottom portion and molded integrally with the battery cell 90.

Hereinabove, the battery pack 90 according to the second embodiment using the rigid laminated film 80 having a three-layer structure as the covering material is described. By appropriately selecting the resin material for the heat-bonding layer 83, there can be provided a safer battery pack which is advantageous not only in that it secures external impact strength without a sealant layer, but also in that it has satisfactory moisture resistance and heat radiation properties.

EXAMPLES

Hereinbelow, embodiments are described in detail with reference to the following Examples, which should not be construed as limiting.

(I) Heat Bonding Test

Using rigid laminated films having a three-layer or four-layer structure prepared using different resin materials in the sealant layer and heat-bonding layer, measurements of the items (a) to (c) below were individually conducted.

Rigid laminated films in Examples 1-1 to 1-34 and Comparative Examples 1-1 and 1-2 were individually prepared in which Al was used in the metal layer, Ny was used in the outer packaging layer, and the materials shown in Table 1 below were used in the sealant layer and heat-bonding layer. The outer packaging layer and the sealant layer were individually formed by applying a film material onto the metallic foil through a bonding layer, and the heat-bonding layer was formed by diluting a hot-melt resin with a solvent and applying the diluted resin to the sealant layer and then drying it.

TABLE 1

| | Outer packaging layer | Metal layer | Sealant layer | Heat-bonding layer |
|---|---|---|---|---|
| Example 1-1 | Ny | Al | — | Acid-modified polypropylene |
| Example 1-2 | Ny | Al | — | Ionomer |
| Example 1-3 | Ny | Al | — | Ethylene-vinyl acetate copolymer |
| Example 1-4 | Ny | Al | — | Ethylene-acrylic acid copolymer |
| Example 1-5 | Ny | Al | — | Ethyl acrylate copolymer |
| Example 1-6 | Ny | Al | — | Methyl acrylate copolymer |
| Example 1-7 | Ny | Al | — | Methacrylic acid copolymer |
| Example 1-8 | Ny | Al | — | Methyl methacrylate copolymer |
| Example 1-9 | Ny | Al | — | Polyacrylonitrile |
| Example 1-10 | Ny | Al | — | Ethylene vinyl alcohol resin |
| Example 1-11 | Ny | Al | — | Polyamide |
| Example 1-12 | Ny | Al | — | Polyester |
| Example 1-13 | Ny | Al | CPP | Ethylene-vinyl acetate copolymer |
| Example 1-14 | Ny | Al | CPP | Ethylene-acrylic acid copolymer |
| Example 1-15 | Ny | Al | CPP | Ethyl acrylate copolymer |
| Example 1-16 | Ny | Al | CPP | Methyl acrylate copolymer |
| Example 1-17 | Ny | Al | CPP | Methacrylic acid copolymer |
| Example 1-18 | Ny | Al | CPP | Methyl methacrylate copolymer |
| Example 1-19 | Ny | Al | CPP | Polyacrylonitrile |
| Example 1-20 | Ny | Al | CPP | Ethylene vinyl alcohol resin |
| Example 1-21 | Ny | Al | CPP | Polyamide |
| Example 1-22 | Ny | Al | CPP | Polyester |
| Example 1-23 | Ny | Al | PE | Ethylene-vinyl acetate copolymer |
| Example 1-24 | Ny | Al | PE | Ethylene-acrylic acid copolymer |
| Example 1-25 | Ny | Al | PE | Ethyl acrylate copolymer |
| Example 1-26 | Ny | Al | PE | Methyl acrylate copolymer |
| Example 1-27 | Ny | Al | PE | Methacrylic acid copolymer |
| Example 1-28 | Ny | Al | PE | Methyl methacrylate copolymer |
| Example 1-29 | Ny | Al | PE | Ionomer |
| Example 1-30 | Ny | Al | PE | Polyacrylonitrile |
| Example 1-31 | Ny | Al | PE | Ethylene vinyl alcohol resin |
| Example 1-32 | Ny | Al | PE | Polyamide |
| Example 1-33 | Ny | Al | PE | Polyester |
| Example 1-34 | Ny | Al | — | Acrylic adhesive |
| Comparative Example 1-1 | Ny | Al | CPP | — |
| Comparative Example 1-2 | Ny | Al | PE | — |

(a) Peel Strength Test 1

The rigid laminated films in the Examples and Comparative Examples were individually bonded by heat seal to a generator device covered with a flexible laminated film in which Ny was used in the outer packaging layer, Al (8021O) was used in the metal layer, and CPP was used in the sealant layer, and then a peel strength between the rigid laminated film and the generator device was measured. The peel strength of the rigid laminated film bonded to the generator device was measured by a 180° peel method in accordance with JIS K6854-2 (Determination of peel strength of bonded assemblies—Part 2).

(b) Peel Strength Test 2

The rigid laminated films in the Examples and Comparative Examples were individually bonded by heat seal to a shaped article formed from polypropylene by injection molding, and then a peel strength between the rigid laminated film and the shaped article was measured. The peel strength was measured by a 180° peel method in accordance with JIS K6854-2 (Determination of peel strength of bonded assemblies—Part 2).

(c) Drop Test

The rigid laminated films in the Examples and Comparative Examples were individually bonded by heat seal to a generator device covered with a flexible aluminum laminated film in which Ny was used in the outer packaging layer, Al (8021O) was used in the metal layer, and CPP was used in the sealant layer to form a battery cell. Then, a top cover and a rear cover formed from polypropylene by injection molding were fitted to the battery cell and they were bonded together by heat seal to prepare a test battery pack. With respect to the battery pack prepared, a drop test was conducted. In the drop test, the battery pack was allowed to drop from a height of 1 m and this operation was repeated 10 times, and then the resultant battery pack was visually checked whether or not the rigid laminated film was peeled off or the top cover or rear cover was peeled off.

The results of the measurements are shown in Table 2 below. The battery pack having a peel strength of 2.0 N/15 mm or more has reliability.

TABLE 2

| | Peel strength to outer packaging layer of generator device (N/15 mm) | Peel strength to resin cover (N/15 mm) | Deformation of battery pack | |
|---|---|---|---|---|
| | | | Rigid laminated film | Resin cover |
| Example 1-1 | 10.2 | 5.9 | None | None |
| Example 1-2 | 5.5 | 3.2 | None | None |
| Example 1-3 | 7.5 | 4.4 | None | None |
| Example 1-4 | 5.3 | 3.1 | None | None |
| Example 1-5 | 3.4 | 2.0 | None | None |
| Example 1-6 | 4.5 | 2.6 | None | None |
| Example 1-7 | 3.6 | 2.1 | None | None |
| Example 1-8 | 5.4 | 3.1 | None | None |
| Example 1-9 | 3.4 | 2.0 | None | None |
| Example 1-10 | 7.1 | 4.1 | None | None |
| Example 1-11 | 6.7 | 3.9 | None | None |
| Example 1-12 | 8.9 | 5.2 | None | None |
| Example 1-13 | 9.6 | 8.4 | None | None |
| Example 1-14 | 7.0 | 6.2 | None | None |
| Example 1-15 | 5.5 | 4.8 | None | None |
| Example 1-16 | 6.2 | 5.5 | None | None |
| Example 1-17 | 5.7 | 5.0 | None | None |
| Example 1-18 | 7.1 | 6.2 | None | None |
| Example 1-19 | 5.1 | 4.5 | None | None |
| Example 1-20 | 9.2 | 8.1 | None | None |
| Example 1-21 | 8.4 | 7.4 | None | None |
| Example 1-22 | 11 | 9.7 | None | None |
| Example 1-23 | 9.1 | 6.2 | None | None |
| Example 1-24 | 7.2 | 4.9 | None | None |
| Example 1-25 | 8.3 | 5.6 | None | None |
| Example 1-26 | 7.4 | 5.0 | None | None |
| Example 1-27 | 9.2 | 6.3 | None | None |
| Example 1-28 | 9.3 | 6.3 | None | None |
| Example 1-29 | 7.2 | 4.9 | None | None |
| Example 1-30 | 10.9 | 7.4 | None | None |
| Example 1-31 | 13.5 | 9.2 | None | None |
| Example 1-32 | 8.7 | 5.9 | None | None |
| Example 1-33 | 13.4 | 9.1 | None | None |
| Example 1-34 | 4.5 | 4.5 | None | None |
| Comparative Example 1-1 | 0.2 | 10.7 | Deformed | None |
| Comparative Example 1-2 | 0.2 | 9.7 | Deformed | None |

As apparent from Table 2, the rigid laminated film, in which acid-modified polypropylene, an ionomer resin, or ethylene vinyl alcohol having high reactivity is directly formed on the inner surface of the metallic foil, has excellent adhesion to each of the outer packaging layer in the flexible laminated film and the resin molded cover.

In addition, as can be seen from, e.g., Examples 3, 13, and 23, the rigid laminated film having the heat-bonding layer formed of the same material and having the sealant layer formed of CPP or PE is further improved in the adhesion to each of the outer packaging layer in the flexible laminated film and the resin molded cover. The reason why the adhesion of the rigid laminated film to the outer packaging layer in the flexible laminated film is improved is presumed that the cushioning effect is increased to advantageously bond together the finely uneven surfaces, and the reason why the adhesion of the rigid laminated film to the resin molded cover is improved is presumed that a material having good adhesion to the material for the resin molded cover is used in the rigid laminated film.

In contrast, in the battery packs in Comparative Examples 1 and 2 having no heat-bonding layer, the rigid laminated film has good adhesion to the resin molded cover, but peeling is caused in the rigid laminated film as external packaging. From this, it is apparent that the rigid laminated film having no heat-bonding layer and having only the sealant layer as an inner layer has poor adhesion to the outer packaging layer in the flexible laminated film.

(II) Measurement of Battery Expansion

With respect to the battery pack having a gel electrolyte produced according to an embodiment and the battery pack having the construction described in the patent document 3 and having a gel electrolyte, battery expansion due to the moisture going into the battery was measured.

An embodiment is described below in detail. A battery pack is first prepared.

Example 2-1

Formation of Generator Device
Preparation of Positive Electrode

92% by weight of lithium cobaltite ($LiCoO_2$), 3% by weight of powdery polyvinylidene fluoride, and 5% by weight of powdery graphite were intimately mixed with each other, and dispersed in N-methylpyrrolidone to prepare a positive electrode composition in a slurry state. The positive electrode composition prepared was uniformly applied to both sides of an Al foil as a current collector for positive electrode, and dried under a reduced pressure at 100° C. for 24 hours to form a cathode active material layer.

Then, the resultant foil was pressed by means of a roll pressing machine to form a positive electrode sheet, and the positive electrode sheet was cut into a strip to obtain a positive electrode, and an Al ribbon lead was welded to the active material unapplied portion of the positive electrode.

Preparation of Negative Electrode

91% by weight of artificial graphite and 9% by weight of powdery polyvinylidene fluoride were intimately mixed with each other, and dispersed in N-methylpyrrolidone to prepare a negative electrode composition in a slurry state. Then, the negative electrode composition prepared was uniformly applied to both sides of a copper foil as a current collector for negative electrode, and dried under a reduced pressure at 120° C. for 24 hours to form an anode active material layer.

Then, the resultant foil was pressed by means of a roll pressing machine to form a negative electrode sheet, and the negative electrode sheet was cut into a strip to obtain a negative electrode, and an Ni ribbon lead was welded to the active material unapplied portion of the negative electrode.

Preparation of Gel Electrolyte

Polyvinylidene fluoride copolymerized with hexafluoropropylene in an amount of 6.9%, a nonaqueous electrolytic solution, and dimethyl carbonate (DMC) as a diluent solvent were mixed with each other and dissolved by stirring to obtain a sol electrolytic solution. The electrolytic solution was prepared by mixing together ethylene carbonate and propylene carbonate in a weight ratio of 6:4, and dissolving $LiPF_6$ and $LiBF_4$ in the mixed solvent so that the respective concentrations became 0.8 mol/kg and 0.2 mol/kg. The weight ratio of the components in the electrolytic solution was polyvinylidene fluoride:electrolytic solution:DMC=1:6:12. Subsequently, the sol electrolytic solution obtained was uniformly applied to both sides of each of the positive electrode and the negative electrode. Then, the solvents were removed, thus forming gel electrolyte layers on both sides of each of the positive electrode and the negative electrode.

Next, the strip positive electrode having the gel electrolyte layers formed on both sides and the strip negative electrode having the gel electrolyte layers formed on both sides were spirally wound in the longitudinal direction through a separator to obtain a battery element. As the separator, a porous polyethylene film having a thickness of 10 μm and a porosity of 33% was used.

The thus prepared battery element was covered with a flexible laminated film, and the three sides (both side portions and top portion) of the flexible laminated film around the battery element were heat-sealed to form a generator device. In this case, the sealed width of the top portion was 2.0 mm, and the sealed width of the side portion was 3.0 mm. As the flexible laminated film, one using aluminum (8021O) in the metal layer, Ny in the outer resin layer, and CPP in the inner resin layer was used.

Fabrication of Battery Pack

Subsequently, the generator device was covered with a rigid laminated film, and they were bonded together using a heater block. As the rigid laminated film, one using aluminum (3003-H18) in the metal layer, Ny in the outer resin layer, CPP in the sealant layer, and EVA in the heat-bonding layer was used. Then, the positive electrode terminal and negative electrode terminal were connected to a circuit board, and the resultant element was contained in a top cover, and then the top cover was fitted to a rear cover and heated again using a heater block, thus producing a battery pack.

Comparative Example 2-1

A battery element similar to that prepared in Example 2-1 was contained in the recess portion formed in a flexible laminated film, and the recess portion was covered with a rigid laminated film. As the flexible laminated film, one using aluminum (8021O) in the metal layer, Ny in the outer resin layer, and CPP in the inner resin layer was used. As the rigid laminated film, one using aluminum (3003-H18) in the metal layer, Ny in the outer resin layer, and CPP in the sealant layer was used.

Then, the four sides (both side portions, top portion, and bottom portion) of the laminated films around the battery element were heat-sealed. In this case, the sealed width of each of the top portion and the bottom portion was 2.0 mm, and the sealed width of the side portion was 3.0 mm. Subsequently, the battery element was placed in a mold and the both side portions were folded so as to cover the battery element, and the joint of the ends of the both side portions were heat-sealed on the recess portion to form a battery cell. In this instance, an adhesive sheet was put on the recess portion so that the both side portions were bonded to the recess portion.

Then, the positive electrode terminal and negative electrode terminal were connected to a circuit board, and the resultant battery cell was contained in a top cover, and then the top cover was fitted to a rear cover and heated again using a heater block, thus producing a battery pack.

(d) Measurement of Battery Expansion

With respect to each of the battery packs in Example 2-1 and Comparative Example 2-1, a battery thickness was first measured, and then a constant current and constant voltage charge was conducted. Specifically, a 0.1C constant current charge was conducted, and switched to a constant voltage charge at a point in time when the voltage between the terminals had reached 4.2 V. The charge was stopped after 2.5 hours had lapsed from the start of the constant voltage charge. Subsequently, the resultant battery pack was stored in an atmosphere at a relative humidity of 90% at a temperature of 60° C. for 30 days, and then a battery thickness was measured again. The battery expansion was determined from the following formula.

Battery expansion (mm)=Battery thickness after storage−Battery thickness before storage The results of the measurement are shown in Table 3 below.

TABLE 3

|  | Battery expansion (mm) |
| --- | --- |
| Example 2-1 | 0.1 |
| Comparative Example 2-1 | 0.5 |

From the above results, it is found that the battery pack in Example 2-1 using the generator device in which the three sides are heat-sealed has a battery expansion as small as 0.1 mm, whereas the battery pack in Comparative Example 2-1 using the generator device in which the four sides are heat-sealed has a battery expansion of 0.5 mm which is larger than that in Example 2-1.

The reason for this is presumed as follows. Moisture is likely to go into the battery pack from the top portion or bottom portion which must be sealed with a smaller width from the viewpoint of the structure of battery. In the battery pack in Example 2-1, the top portion is sealed, but, in the battery pack in Comparative Example 2-1, the top portion and bottom portion are individually sealed. Therefore, moisture goes into the battery pack in Comparative Example 2-1 and gas is generated in the battery pack, thus causing remarkable battery expansion.

(III) Leak Test

The battery pack having an electrolytic solution produced according to an embodiment and the battery pack having the construction described in JP 2005-166650 and having an electrolytic solution were individually subjected to press test, and the resultant battery packs were individually checked on liquid leakage.

An embodiment is described below. A battery pack is first prepared.

Example 3-1

A battery pack having substantially the same construction as that in Example 2-1 except that an electrolytic solution was used instead of the gel electrolyte was prepared. The method for preparing the electrolytic solution and the procedure for preparing the generator device are described below.

Preparation of Electrolytic Solution

As a solvent, a mixed solvent of ethylene carbonate and propylene carbonate in a weight ratio of 6:4 was used, and LiPF$_6$ and LiBF$_4$ as electrolyte salts were dissolved in the mixed solvent so that the respective concentrations became 0.8 mol/kg and 0.2 mol/kg to prepare an electrolytic solution.

Fabrication of Battery Pack

Next, a positive electrode and a negative electrode were spirally wound in the longitudinal direction through a separator to obtain a battery element. As the separator, a porous polyethylene film having a thickness of 10 μm and a porosity of 33% was used.

The thus prepared battery element was covered with a flexible laminated film, and the two sides (side portion and top portion) of the flexible laminated film around the battery element were heat-sealed. Then, the electrolytic solution was charged through the unsealed opening portion, and then the opening portion was sealed up to form a generator device.

Comparative Example 3-1

A battery pack having substantially the same construction as that in Comparative Example 2-1 except that an electrolytic solution was used instead of the gel electrolyte was prepared. In the electrolytic solution, the same electrolyte as that used in Example 3-1 was used.

Fabrication of Battery Pack

A battery element similar to that prepared in Example 3-1 was contained in the recess portion formed in a flexible laminated film, and the recess portion was covered with a rigid laminated film. Then, the three sides (side portion, top portion, and bottom portion) of the laminated films around the battery element were heat-sealed. In this case, the sealed width of each of the top portion and the bottom portion was 2.0 mm, and the sealed width of the side portion was 3.0 mm. Then, the electrolytic solution was charged through the unsealed opening portion, and then the opening portion was sealed up.

Subsequently, the battery element was placed in a mold and the both side portions were folded so as to cover the battery element, followed by heat seal by heating and pressing the top and bottom of the battery element, thus forming a battery cell. In this instance, an adhesive sheet was put on the recess portion so that the both side portions were bonded to the recess portion. Then, the positive electrode terminal and negative electrode terminal were connected to a circuit board, and the circuit board was contained in a top cover, and then the top cover was fitted to a rear cover and heated again using a heater block, thus producing a battery pack.

(e) Press Test

A pressure of 1.0 t was applied to each of the battery packs in Example 3-1 and Comparative Example 3-1, and the resultant battery packs were individually checked on liquid leakage. With respect to each of the battery packs in Example 3-1 and Comparative Example 3-1, 100 pieces were tested to measure a leakage ratio.

The results of the measurement are shown in Table 4 below.

TABLE 4

| | Leakage ratio (%) |
|---|---|
| Example 3-1 | 29 |
| Comparative Example 3-1 | 62 |

From the above results, it is found that the battery in Example 3-1 has a low leakage ratio, as compared to the battery pack in Comparative Example 3-1.

(IV) Battery Strength Test

Battery packs having the construction in an embodiment and using different metallic foils in the rigid laminated film were prepared, and their battery pack strengths were checked by a drop test.

An embodiment is described below in detail. A battery pack is first prepared.

Example 4-1

Fabrication of Battery Pack

A battery pack was prepared using the same materials and procedure as those in Example 2-1. As the rigid laminated film, one using aluminum (3003-H18) having a thickness of 100 μm in the metal layer, Ny in the outer resin layer, CPP in the sealant layer, and EVA in the heat-bonding layer was used.

Example 4-2

A battery pack was prepared in substantially the same manner as in Example 4-1 except that the metal layer in the rigid laminated film was formed of aluminum (3004-H18).

Example 4-3

A battery pack was prepared in substantially the same manner as in Example 4-1 except that the metal layer in the rigid laminated film was formed of aluminum (1N30-H18).

Example 4-4

A battery pack was prepared in substantially the same manner as in Example 4-1 except that the metal layer in the rigid laminated film was formed of tin-plated iron (tin plate) having a thickness of 80 μm.

Example 4-5

A battery pack was prepared in substantially the same manner as in Example 4-1 except that the metal layer in the rigid laminated film was formed of zinc-plated iron (galvanized sheet steel) having a thickness of 80 μm.

Example 4-6

A battery pack was prepared in substantially the same manner as in Example 4-1 except that the metal layer in the rigid laminated film was formed of nickel-plated iron having a thickness of 80 μm.

Example 4-7

A battery pack was prepared in substantially the same manner as in Example 4-1 except that the metal layer in the rigid laminated film was formed of titanium having a thickness of 60 μm.

Example 4-8

A battery pack was prepared in substantially the same manner as in Example 4-1 except that the metal layer in the rigid laminated film was formed of copper having a thickness of 60 μm.

Example 4-9

A battery pack was prepared in substantially the same manner as in Example 4-1 except that the metal layer in the rigid laminated film was formed of stainless steel (SUS304) having a thickness of 50 µm.

Comparative Example 4-1

A battery pack was prepared in substantially the same manner as in Example 4-1 except that the metal layer in the rigid laminated film was formed of stainless steel (SUS304) having a thickness of 40 µm.

Comparative Example 4-2

A battery pack was prepared in substantially the same manner as in Example 4-1 except that the metal layer in the rigid laminated film was formed of aluminum (1N30-O).

Comparative Example 4-3

A battery pack was prepared in substantially the same manner as in Example 4-1 except that the metal layer in the rigid laminated film was formed of aluminum (1N30-O) having a thickness of 200 µm.

(f) Drop Test

The battery packs in Examples 4-1 to 4-9 and Comparative Examples 4-1 to 4-3 were individually allowed to drop from a height of 1 m, and then the resultant battery packs were visually checked whether or not they suffered deformation. The results of the measurement are shown in Table 5 below.

TABLE 5

|  | Material for metal layer | Thickness of metal layer (µm) | Deformation of battery pack |
| --- | --- | --- | --- |
| Example 4-1 | Aluminum (3003-H18) | 100 | Slight |
| Example 4-2 | Aluminum (3004-H18) | 100 | Slight |
| Example 4-3 | Aluminum (1N30-H18) | 100 | Slight |
| Example 4-4 | Tin-plated iron (Tin plate) | 80 | None |
| Example 4-5 | Zinc-plated iron (Galvanized sheet steel) | 80 | None |
| Example 4-6 | Nickel-plated iron | 80 | None |
| Example 4-7 | Titanium | 60 | None |
| Example 4-8 | Copper | 60 | None |
| Example 4-9 | Stainless steel (SUS304) | 50 | None |
| Comparative Example 4-1 | Stainless steel (SUS304) | 40 | Small |
| Comparative Example 4-2 | Aluminum (1N30-O) | 100 | Bent |
| Comparative Example 4-3 | Aluminum (1N30-O) | 200 | Small |

From the above results, it is found that the battery packs in the Examples using hard metal materials individually suffer almost no deformation in the drop test, whereas the battery packs in the Comparative Examples using soft metal materials suffer marked deformation. Further, in Comparative Example 4-1 using the hard metal material having a smaller thickness, the battery is likely to suffer deformation. From this, it is desired that a hard metal material having a thickness of 50 µm or more is used.

(V) Nail Penetration Test

With respect to the battery pack having the construction in an embodiment and the battery having a generator device which includes a battery element covered with a flexible laminated film and which is contained in a molded case made of a plastic, a nail penetration test was conducted, and a heat generation temperature of the battery tested was measured. With respect to the battery pack having the construction in an embodiment, various battery packs are prepared using different materials for the metal layer in the rigid laminated film.

The present invention is described below in detail. A battery pack is first prepared.

Example 5-1

Fabrication of Battery Pack

A battery pack was prepared using the same materials and procedure as those in Example 2-1. As the rigid laminated film, one using aluminum (3003-H18) having a thickness of 100 µm in the metal layer, Ny in the outer resin layer, CPP in the sealant layer, and EVA in the heat-bonding layer was used.

Example 5-2

A battery pack was prepared in substantially the same manner as in Example 5-1 except that the metal layer in the rigid laminated film was formed of aluminum (3004-H18).

Example 5-3

A battery pack was prepared in substantially the same manner as in Example 5-1 except that the metal layer in the rigid laminated film was formed of aluminum (1N30-H18).

Example 5-4

A battery pack was prepared in substantially the same manner as in Example 5-1 except that the metal layer in the rigid laminated film was formed of tin-plated iron (tin plate).

Example 5-5

A battery pack was prepared in substantially the same manner as in Example 5-1 except that the metal layer in the rigid laminated film was formed of zinc-plated iron (galvanized sheet steel).

Example 5-6

A battery pack was prepared in substantially the same manner as in Example 5-1 except that the metal layer in the rigid laminated film was formed of nickel-plated iron.

Example 5-7

A battery pack was prepared in substantially the same manner as in Example 5-1 except that the metal layer in the rigid laminated film was formed of titanium.

Example 5-8

A battery pack was prepared in substantially the same manner as in Example 5-1 except that the metal layer in the rigid laminated film was formed of copper.

Example 5-9

A battery pack was prepared in substantially the same manner as in Example 5-1 except that the metal layer in the rigid laminated film was formed of stainless steel (SUS304).

Comparative Example 5-1

A circuit board was connected to a generator device similar to that in Example 2-1, and the resultant generator device was contained in a molded case made of polypropylene to produce a battery pack.

(g) Nail Penetration Test

With respect to each of the battery packs in Examples 5-1 to 5-9 and Comparative Example 5-1, a 0.1C constant current charge was conducted until the voltage had reached 4.4 V. After completion of the charge, the battery pack was penetrated with a nail at the center of a wide surface, and a heat generation temperature was measured.

The results of the measurement are shown in Table 6 below.

TABLE 6

| | Covering for battery pack | Material for metal layer in rigid laminated film | Temperature in battery pack (° C.) |
|---|---|---|---|
| Example 5-1 | Rigid laminated film | Aluminum (3003-H18) | 88 |
| Example 5-2 | Rigid laminated film | Aluminum (3004-H18) | 89 |
| Example 5-3 | Rigid laminated film | Aluminum (1N30-H18) | 89 |
| Example 5-4 | Rigid laminated film | Tin-plated iron (Tin plate) | 69 |
| Example 5-5 | Rigid laminated film | Zinc-plated iron (Galvanized sheet steel) | 72 |
| Example 5-6 | Rigid laminated film | Nickel-plated iron | 71 |
| Example 5-7 | Rigid laminated film | Titanium | 80 |
| Example 5-8 | Rigid laminated film | Copper | 67 |
| Example 5-9 | Rigid laminated film | Stainless steel (SUS304) | 75 |
| Comparative Example 5-1 | Plastic molded case | — | 140 |

From the above results, it is found that the battery in Comparative Example 5-1 has a heat generation temperature as high as 140° C., whereas the battery packs in the Examples using the covering material including a hard metal material have a heat generation temperature of 90° C. or lower, indicating that the battery packs can secure safety when being penetrated with a nail.

By using the rigid laminated film, even when the battery is penetrated with a nail, heat generation occurs only at the surface of the battery penetrated with the nail. In addition, it is presumed that heat radiation is facilitated, thus preventing heat from being stored in the battery pack.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
a battery element;
a generator device having said battery element disposed on a flexible covering material, said flexible covering material being folded to cover said battery element, wherein three sides of said flexible covering material around said battery element are sealed;
a rigid covering material for covering said generator device, said rigid covering material having an opening and being bonded to said flexible covering material of said generator device; and
a cover fitted into the opening of said rigid covering material,
wherein said rigid covering material has a four-layer structure having an outer packaging layer, a metal layer, an inner packaging layer, and a heat-bonding layer which are stacked on one another,
wherein said inner packaging layer is bonded to said cover, and
wherein said heat-bonding layer is at least one material selected from the group consisting of an ethylene-vinyl acetate copolymer, an ethylene-acrylic acid copolymer, an ethyl acrylate copolymer, a methyl acrylate copolymer, a methacrylic acid copolymer, a methyl methacrylate copolymer, polyacrylonitrile, an ethylene vinyl alcohol resin, a polyamide resin, a polyester resin, acid-modified polypropylene, and an ionomer.

2. The battery pack according to claim 1,
wherein said flexible covering material has a three-layer structure having an outer packaging layer, a metal layer, and an inner packaging layer which are stacked on one another, and
wherein said outer packaging layer in said flexible covering material is bonded to said heat-bonding layer in said rigid covering material.

3. The battery pack according to claim 1, wherein said outer packaging layer in said rigid covering material includes a material selected from the group consisting of a polyolefin resin, a polyamide resin, a polyimide resin, and polyester.

4. The battery pack according to claim 1, wherein said inner packaging layer in said rigid covering material is a cast polyolefin resin or an ionomer.

5. The battery pack according to claim 1,
wherein said metal layer in said rigid covering material is formed of a hard metal, and
wherein said hard metal is hard aluminum, stainless steel, titanium, copper, or iron plated with tin, zinc, or nickel.

6. The battery pack according to claim 5, wherein said hard metal has a thickness ranging from 50 to 100 μm.

7. The battery pack according to claim 5, wherein said hard aluminum is 3003H18, 3004H18, or 1N30H18.

8. The battery pack according to claim 5, wherein said stainless steel is austenite.

9. The battery pack according to claim 1, wherein the ends of said rigid covering material are joined on one plane or one side of said generator device so that said ends do not overlap, and a label is put on said rigid covering material so that the label covers the joint of the ends of said rigid covering material.

10. The battery pack according to claim 1, wherein the heat-bonding layer has a melting point lower than that of the inner packaging layer.

11. The battery pack according to claim 1, wherein the inner packaging layer has a thickness ranging from 25 to 35 μm.

* * * * *